US009747440B2

(12) United States Patent
Gupta et al.

(10) Patent No.: US 9,747,440 B2
(45) Date of Patent: Aug. 29, 2017

(54) ON-LINE BEHAVIORAL ANALYSIS ENGINE IN MOBILE DEVICE WITH MULTIPLE ANALYZER MODEL PROVIDERS

(71) Applicant: QUALCOMM Incorporated, San Diego, CA (US)

(72) Inventors: Rajarshi Gupta, Sunnyvale, CA (US); Mark Bapst, S. Barrington, IL (US); Mohammad H Reshadi, Sunnyvale, CA (US); Samir Kumar, Emerald Hills, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/937,462

(22) Filed: Jul. 9, 2013

(65) Prior Publication Data
US 2014/0053261 A1 Feb. 20, 2014

Related U.S. Application Data

(60) Provisional application No. 61/765,461, filed on Feb. 15, 2013, provisional application No. 61/683,274, filed on Aug. 15, 2012.

(51) Int. Cl.
*G06F 21/55* (2013.01)
*G06F 9/445* (2006.01)
(Continued)

(52) U.S. Cl.
CPC .............. *G06F 21/55* (2013.01); *G06F 8/61* (2013.01); *G06F 8/65* (2013.01); *G06F 11/3013* (2013.01);
(Continued)

(58) Field of Classification Search
USPC .......... 726/22, 2, 21, 36; 713/150, 163, 181; 380/255, 264, 276
See application file for complete search history.

(56) References Cited

U.S. PATENT DOCUMENTS

| 5,870,735 A | 2/1999 | Agrawal et al. |
| 6,532,541 B1 | 3/2003 | Chang et al. |
| (Continued) | | |

FOREIGN PATENT DOCUMENTS

| CN | 1961525 A | 5/2007 |
| CN | 101689167 A | 3/2010 |
| (Continued) | | |

OTHER PUBLICATIONS

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.
(Continued)

*Primary Examiner* — Farid Homayounmehr
*Assistant Examiner* — Sharif E Ullah
(74) *Attorney, Agent, or Firm* — The Marbury Law Group, PLLC

(57) ABSTRACT

Methods, systems and devices for generating data models in a client-cloud communication system may include applying machine learning techniques to generate a first family of classifier models that describe a cloud corpus of behavior vectors. Such vectors may be analyzed to identify factors in the first family of classifier models that have the highest probability of enabling a mobile device to better determine whether a mobile device behavior is malicious or benign. Based on this analysis, a second family of classifier models may be generated that identify significantly fewer factors and data points as being relevant for enabling the mobile
(Continued)

device to better determine whether the mobile device behavior is malicious or benign based on the determined factors. A mobile device classifier module based on the second family of classifier models may be generated and made available for download by mobile devices, including devices contributing behavior vectors.

36 Claims, 13 Drawing Sheets

(51) Int. Cl.
*G06F 21/31* (2013.01)
*H04L 29/06* (2006.01)
*H04W 12/12* (2009.01)
*G06N 5/04* (2006.01)
*G06F 11/30* (2006.01)
*G06F 11/34* (2006.01)

(52) U.S. Cl.
CPC ........ *G06F 11/3447* (2013.01); *G06F 21/316* (2013.01); *G06F 21/552* (2013.01); *G06N 5/043* (2013.01); *H04L 63/1425* (2013.01); *H04W 12/12* (2013.01); *G06F 11/3409* (2013.01); *G06F 11/3476* (2013.01); *G06F 2201/865* (2013.01)

(56) References Cited

U.S. PATENT DOCUMENTS

| | | |
|---|---|---|
| 6,643,802 B1 | 11/2003 | Frost et al. |
| 6,647,260 B2 | 11/2003 | Dusse et al. |
| 7,051,327 B1 | 5/2006 | Milius et al. |
| 7,401,359 B2 | 7/2008 | Gartside et al. |
| 7,559,053 B2 | 7/2009 | Krassovsky et al. |
| 7,561,877 B2 | 7/2009 | Cassett et al. |
| 7,571,478 B2 | 8/2009 | Munson et al. |
| 7,600,014 B2 | 10/2009 | Russell et al. |
| 7,650,317 B2 | 1/2010 | Basu et al. |
| 7,676,573 B2 | 3/2010 | Herzog et al. |
| 7,694,150 B1 | 4/2010 | Kirby |
| 7,757,292 B1 | 7/2010 | Renert et al. |
| 7,774,599 B2 | 8/2010 | Guo et al. |
| 7,831,237 B2 | 11/2010 | Passarella et al. |
| 7,831,248 B2 | 11/2010 | Lee |
| 7,849,360 B2 | 12/2010 | Largman et al. |
| 7,852,938 B2 | 12/2010 | Shi et al. |
| 7,877,621 B2 | 1/2011 | Jacoby et al. |
| 7,881,291 B2 | 2/2011 | Grah |
| 7,890,443 B2 | 2/2011 | Zhang et al. |
| 7,945,955 B2 | 5/2011 | Katkar |
| 8,045,958 B2 | 10/2011 | Kahandaliyanage |
| 8,087,067 B2 | 12/2011 | Mahaffey et al. |
| 8,095,964 B1 | 1/2012 | Zhong et al. |
| 8,161,548 B1 | 4/2012 | Wan |
| 8,201,244 B2 | 6/2012 | Sun et al. |
| 8,201,249 B2 | 6/2012 | McCallam |
| 8,225,093 B2 | 7/2012 | Fok |
| 8,245,295 B2 | 8/2012 | Park et al. |
| 8,245,315 B2 | 8/2012 | Cassett et al. |
| 8,266,698 B1 | 9/2012 | Seshardi et al. |
| 8,311,956 B2 | 11/2012 | Sen et al. |
| 8,312,545 B2 | 11/2012 | Tuvell et al. |
| 8,321,941 B2 | 11/2012 | Tuvell et al. |
| 8,331,987 B2 | 12/2012 | Rosenblatt |
| 8,332,945 B2 | 12/2012 | Kim et al. |
| 8,347,386 B2 | 1/2013 | Mahaffey et al. |
| 8,397,301 B2 | 3/2013 | Hering et al. |
| 8,443,439 B2 | 5/2013 | Lamastra et al. |
| 8,458,809 B2 | 6/2013 | Adams et al. |
| 8,516,584 B2 | 8/2013 | Moskovitch et al. |
| 8,533,844 B2 | 9/2013 | Mahaffey et al. |
| 8,554,912 B1 | 10/2013 | Reeves et al. |
| 8,694,744 B1 | 4/2014 | Raj et al. |
| 8,701,192 B1 | 4/2014 | Glick et al. |
| 8,762,298 B1 | 6/2014 | Ranjan et al. |
| 8,763,127 B2 | 6/2014 | Yao et al. |
| 8,775,333 B1 | 7/2014 | Zahn |
| 8,782,412 B2 | 7/2014 | Charles et al. |
| 8,943,204 B2 | 1/2015 | Caldeira De Andrada et al. |
| 9,432,361 B2 | 8/2016 | Mahaffey et al. |
| 2002/0099756 A1 | 7/2002 | Catthoor et al. |
| 2004/0039924 A1 | 2/2004 | Baldwin et al. |
| 2004/0068721 A1 | 4/2004 | O'Neill et al. |
| 2004/0083366 A1 | 4/2004 | Nachenberg et al. |
| 2004/0221163 A1 | 11/2004 | Jorgensen et al. |
| 2005/0144480 A1 | 6/2005 | Kim et al. |
| 2006/0026464 A1 | 2/2006 | Atkin et al. |
| 2006/0085854 A1 | 4/2006 | Agrawal et al. |
| 2006/0288209 A1 | 12/2006 | Vogler |
| 2007/0006304 A1 | 1/2007 | Kramer et al. |
| 2007/0136455 A1 | 6/2007 | Lee et al. |
| 2007/0174490 A1 | 7/2007 | Choi et al. |
| 2007/0192866 A1 | 8/2007 | Sagoo et al. |
| 2007/0199060 A1 | 8/2007 | Touboul |
| 2007/0220327 A1 | 9/2007 | Ruscio et al. |
| 2007/0283170 A1 | 12/2007 | Yami et al. |
| 2007/0287387 A1 | 12/2007 | Keum et al. |
| 2007/0294768 A1 | 12/2007 | Moskovitch et al. |
| 2008/0016339 A1 | 1/2008 | Shukla |
| 2008/0026464 A1 | 1/2008 | Borenstein et al. |
| 2008/0046755 A1 | 2/2008 | Hayes |
| 2008/0047009 A1 | 2/2008 | Overcash et al. |
| 2008/0086773 A1 | 4/2008 | Tuvell et al. |
| 2008/0109495 A1 | 5/2008 | Herberger et al. |
| 2008/0140821 A1 | 6/2008 | Tada |
| 2008/0162686 A1 | 7/2008 | Kalaboukis et al. |
| 2008/0163382 A1 | 7/2008 | Blue et al. |
| 2008/0172746 A1 | 7/2008 | Lotter et al. |
| 2008/0228429 A1 | 9/2008 | Huang et al. |
| 2009/0019546 A1 | 1/2009 | Park et al. |
| 2009/0019551 A1 | 1/2009 | Haga et al. |
| 2009/0192955 A1 | 7/2009 | Tang et al. |
| 2009/0199296 A1 | 8/2009 | Xie et al. |
| 2009/0217078 A1 | 8/2009 | Cassett et al. |
| 2009/0239531 A1 | 9/2009 | Andreasen et al. |
| 2009/0287618 A1 | 11/2009 | Weinberger et al. |
| 2009/0288080 A1 | 11/2009 | Partridge |
| 2009/0288164 A1 | 11/2009 | Adelstein et al. |
| 2009/0293121 A1 | 11/2009 | Bigus et al. |
| 2009/0300765 A1 | 12/2009 | Moskovitch et al. |
| 2009/0327168 A1 | 12/2009 | Weinberger et al. |
| 2010/0005045 A1 | 1/2010 | Hiraoka et al. |
| 2010/0010949 A1 | 1/2010 | Ito et al. |
| 2010/0011029 A1 | 1/2010 | Niemela |
| 2010/0036786 A1 | 2/2010 | Pujara |
| 2010/0082513 A1 | 4/2010 | Liu |
| 2010/0105404 A1 | 4/2010 | Palanki et al. |
| 2010/0107257 A1 | 4/2010 | Ollmann |
| 2010/0128125 A1 | 5/2010 | Warzelhan |
| 2010/0153371 A1 | 6/2010 | Singh |
| 2010/0154032 A1 | 6/2010 | Ollmann |
| 2010/0175135 A1 | 7/2010 | Kandek et al. |
| 2010/0192201 A1 | 7/2010 | Shimoni et al. |
| 2010/0192222 A1 | 7/2010 | Stokes et al. |
| 2010/0241974 A1 | 9/2010 | Rubin et al. |
| 2010/0251340 A1 | 9/2010 | Martin et al. |
| 2010/0262693 A1 | 10/2010 | Stokes et al. |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 | 5/2011 | Dods et al. |
| 2011/0145920 A1* | 6/2011 | Mahaffey et al. ............... 726/22 |
| 2011/0161452 A1 | 6/2011 | Poornachandran et al. |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |

(56) References Cited

U.S. PATENT DOCUMENTS

| | | |
|---|---|---|
| 2011/0302656 A1 | 12/2011 | El-Moussa |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 | 3/2012 | Larsson et al. |
| 2012/0096539 A1 | 4/2012 | Hu et al. |
| 2012/0110174 A1 | 5/2012 | Wootton et al. |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | McReynolds |
| 2012/0167218 A1 | 6/2012 | Poornachandran et al. |
| 2012/0167219 A1 | 6/2012 | Zaitsev et al. |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2012/0331137 A1 | 12/2012 | Olsen et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0073983 A1 | 3/2013 | Rasmussen et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0032358 A1 | 1/2014 | Perkowitz et al. |
| 2014/0051432 A1 | 2/2014 | Gupta et al. |
| 2014/0053260 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz |
| 2014/0205099 A1 | 7/2014 | Christodorescu et al. |
| 2014/0237595 A1 | 8/2014 | Sridhara et al. |
| 2014/0245306 A1 | 8/2014 | Gathala |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0339675 A1 | 11/2015 | Tuchman et al. |
| 2015/0356462 A1 | 12/2015 | Fawaz et al. |
| 2016/0088009 A1 | 3/2016 | Gupta et al. |

FOREIGN PATENT DOCUMENTS

| | | |
|---|---|---|
| CN | 101770453 A | 7/2010 |
| CN | 101882000 A | 11/2010 |
| CN | 102110211 A | 6/2011 |
| CN | 102202102 A | 9/2011 |
| CN | 102222192 A | 10/2011 |
| CN | 102591696 A | 7/2012 |
| CN | 102651061 A | 8/2012 |
| CN | 102790758 A | 11/2012 |
| EP | 1182552 A2 | 2/2002 |
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2515250 A1 | 10/2012 |
| EP | 2680182 A1 | 1/2014 |
| JP | 2008234520 A | 10/2008 |
| JP | 2010113488 A | 5/2010 |
| JP | 2010520566 A | 6/2010 |
| JP | 2011138219 A | 7/2011 |
| JP | 2012212380 A | 11/2012 |
| KR | 20060033067 A | 4/2006 |
| TW | 200937198 A | 9/2009 |
| TW | 201129817 A | 9/2011 |
| TW | 201239618 A | 10/2012 |
| WO | 06012375 | 2/2006 |
| WO | 2009017231 A2 | 2/2009 |
| WO | 2010048502 | 4/2010 |
| WO | 2010126416 A1 | 11/2010 |
| WO | 2011147580 A1 | 12/2011 |
| WO | 2013/016692 A2 | 1/2013 |
| WO | 2013080096 A1 | 6/2013 |
| WO | 2013172865 A1 | 11/2013 |
| WO | 2013173003 A2 | 11/2013 |
| WO | 2013173044 A2 | 11/2013 |

OTHER PUBLICATIONS

Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009, pp. 675-678, XP055107983, DOI: 10.1109/WI-IAT.2009.113 the whole document.

Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516-520, XP031200055, DOI: 10.1109/ WI-IATW.2007.52 the whole document.

Kachirski O., et al., "Effective Intrusion Detection Using Windows Sensors in Wireless Ad Hoc Networks", IEEE Proceedings of the 36th Hawaii International Conference on System Sciences, 2002, 8 Pages.

Kirda E., et al., "Behavior-Based Spyware Detection", 15th USENIX Security Symposium, 2002, pp. 273-288.

Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.

Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.

Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.

Tabish S.M., "Malware detection using statistical analysis of byte-level file content", Proceedings of the ACM SIGKDD Workshop on

(56) References Cited

OTHER PUBLICATIONS

Cybersecurity and Intelligence Informatics (CSI-KDD'09), Jun. 28, 2009, pp. 23-31, XP055107225, DOI: 10.1145/1599272.1599278 the whole document.
De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.
International Search Report and Written Opinion—PCT/US2013/078350—ISA/EPO—Oct. 29, 2014.
Saller K., et al, "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.
Caruana, et al., "An Empirical Comparison of Supervised Learning Algorithms", ICML, 2006, 8 pgs.
Caruana, et al., "An Empirical Evaluation of Supervised Learning in High Dimensions", ICML, 2008, 8 pgs.
Qin F., "System Support for Improving Software Dependability During Production Runs," Urbana, Illinois, 1998, pp. 1-116.
Shabtai A., et al., "Dectecting unknown malicious code by applying classification techniques on OpCode patterns," Security Informatics a Springer Open Journal, 2012, vol. 1 (1), pp. 1-22.
Wang Y-M., et al., "STRIDER: A Black-Box, State-based Approach to Change and Configuration Management and Support," 2003 LISA XVII—Oct. 26-31, 2003—San Diego, CA, pp. 165-178.
Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.
Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.
Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.
Shasta A., "Malware Detection on Mobile Devices", Proceedings of the 11th International Conference on Mobile Data Management, (MDM'2010), May 23, 2010, pp. 289-290, XP031692994, DOI: 10.1109/MDM.2010.28.
Sheen S., et al., "Network Intrusion Detection using Feature Selection and Decision tree classifier," TENCON—IEEE Region 10 Conference, 2008, pp. 1-4.
Shabtai A., et al., "a Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1] —paragraph [5.3.4].
Co-pending U.S. Appl. No. 13/558,527, filed Jul. 26, 2012.
Kolter J.Z., et al., "Learning to Detect Malicious Executables in the Wild", ACM Knowl. Discovery and Data Mining (KDD), 2004, pp. 470-478.
Gavin McWilliams: "Malware detection methods for fixed and mobile networks", Centre for Secure Information Technologies—Queen's University Belfast, Jan. 23, 2013, pp. 1-21, XP017577639, [retrieved on Jan. 23, 2013] the whole document.
Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/Jarle Kittilsen.pdf [retrieved on Dec. 14, 2012] the whole document.
Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrived on Jun. 13, 2013] the whole document.
Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.
Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.
Kaspersky Endpoint Security 8 for Smartphone Program Version 8.0, Updated on Feb. 8, 2012.
Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9-May 12, 1999.
Tan, P.N., et al., "Introduction to data mining," Library of Congress, 2006, Chapter 4.
Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.
Faddoul J.B., et al., "Boosting Multi-Task Weak Learners with Applications to Textual and Social Data," Ninth International Conference on Machine Learning and Applications (ICMLA), Dec. 2010, pp. 367-372.
Niculescu-Mizil A., et al., "Predicting Good Probabilities with Supervised Learning", Proceedings/Twenty-Second ntemational Conference on Machine Learning, Bonn, Germany, Aug. 7-11, 2005, Association for Computing Machinery, New York, Aug. 7, 2005 (Aug. 7, 2005), pp. 625-632, XP058203964,DOI: 10.1145/1102351.11 024301SBN: 978-1-59593-180-1.
Hu W., et al., "Online Adaboost-Based Parameterized Methods for Dynamic Distributed Network Intrusion Detection", IEEE Transactions on Cybernetics, vol. 44, No. 1, Mar. 27, 2013 (Mar. 27, 2013), pp. 66-82, XP011533908, DOI: 10.1109/TCYB.2013.2247592.
Jean E., et al., "Addressing Mobile Agent Security Through Agent Collaboration", Journal of Information Processing Systems, vol. 3, No. 2, Dec. 2007 (Dec. 2007), pp. 43-53, XP055341844, DOI: 10.3745/JIPS.2008.3.2.043.

* cited by examiner

ON-LINE BEHAVIORAL ANALYSIS ENGINE IN MOBILE DEVICE WITH MULTIPLE ANALYZER MODEL PROVIDERS

RELATED APPLICATIONS

This application claims the benefit of priority to U.S. Provisional Patent Application No. 61/765,461 entitled "On-Line Behavioral Analysis Engine in Mobile Device with Multiple Analyzer Model Providers" filed Feb. 15, 2013, and U.S. Provisional Application No. 61/683,274, entitled "System, Apparatus and Method for Adaptive Observation of Mobile Device Behavior" filed Aug. 15, 2012, the entire contents of both which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance as well as power utilization levels. Accordingly, identifying and correcting the conditions and/or mobile device behaviors that may negatively impact the mobile device's long term and continued performance and power utilization levels is beneficial to users.

SUMMARY

The various aspects include methods of monitoring mobile device behaviors in a mobile device, which may include receiving a behavior model from an application download service that identifies the factors and data points that are most relevant to enabling the mobile device processor to better determine whether a mobile device behavior is benign or malicious, installing the received behavior model in the mobile device in conjunction with an existing behavior analyzer engine installed in the mobile device, and using the installed behavior model to monitor one or more mobile device behaviors.

In an aspect, receiving the behavior model may include receiving a software application that identifies factors and data points most relevant to enabling the mobile device processor to better determine whether a mobile device behavior is benign or malicious. In a further aspect, receiving the behavior model may include receiving an XML, JSON, YAML, HTML/XHTML, or other markup language file that identifies factors and data points most relevant to enabling the mobile device processor to better determine whether a mobile device behavior is benign or malicious. In a further aspect, receiving the behavior model may include receiving a finite state machine representation that may include a mapping of features to behavior classifications.

In a further aspect, the method may include replacing an existing behavior model with the received behavior model. In an aspect, the method may also include linking the received behavior model to the existing behavior analyzer engine so that when the existing behavior analyzer engine performs analysis operations it does so using the received behavior model.

In a further aspect, the method may include updating an existing behavior model by extending it with information included in the received behavior model, and/or linking the updated behavior model to the existing behavior analyzer engine so that when the existing behavior analyzer engine performs analysis operations it does so using the updated behavior model.

In a further aspect, the method may include receiving a plurality of behavior models from a plurality of public networks, and updating at least one existing behavior model with information included in one or more of the received plurality of behavior models.

In a further aspect, receiving the behavior model from the application download service may include receiving the behavior model from one of a cloud service network server, an app store server, a web server identified via uniform resource locator address, and a file transfer protocol service network server.

In a further aspect, receiving the behavior model from the application download service may include accessing and authenticating an online app store by the mobile device processor, downloading a menu of behavior models available for download or update from the online app store, receiving in the mobile device processor a user selection input, requesting download or update of a user-selected behavior model from the online app store, and receiving the requested user-selected behavior model in a download buffer of the mobile device.

In a further aspect, installing the received behavior model in the mobile device in conjunction with the existing behavior analyzer engine installed in the mobile device may include validating the received behavior model, installing the validated behavior model in a memory of the mobile device, and registering the installed behavior model with an observer module and/or an analyzer module of the mobile device.

In a further aspect, using the installed behavior model to monitor one or more mobile device behaviors may include observing mobile device behaviors over a period of time, identifying mobile device behaviors that are inconsistent with normal mobile device operations based on observing mobile device behaviors over the period of time, generating a behavior vector based on mobile device behaviors that are that are identified as inconsistent with the normal mobile device operations, and comparing the generated behavior vector to the installed behavior model to determine whether at the identified mobile device behaviors are benign, suspicious, or malicious. In a further aspect, the method may include receiving a new behavior model that identifies additional factors and data points as being relevant to enabling the mobile device processor to better determine whether a mobile device behavior is benign or malicious, updating the installed behavior model with information included in the new behavior model in response to determining that an identified mobile device behavior is suspicious, and comparing the generated behavior vector to the updated behavior model to better determine whether the identified suspicious mobile device behavior is benign or malicious.

Further aspects include a computing device having a mobile device processor, means for receiving a behavior model from an application download service that identifies factors and data points most relevant to enabling the mobile device processor to better determine whether a mobile device behavior is benign or malicious, means for installing the received behavior model in conjunction with an existing behavior analyzer engine, and means for using the installed behavior model to monitor one or more mobile device behaviors.

In an aspect, means for receiving the behavior model may include means for receiving a software application that identifies factors and data points most relevant to enabling the mobile device processor to better determine whether a mobile device behavior is benign or malicious. In a further aspect, means for receiving the behavior model may include means for receiving an XML file that identifies factors and data points most relevant to enabling the mobile device processor to better determine whether a mobile device behavior is benign or malicious. In a further aspect, means for receiving the behavior model may include means for receiving a finite state machine representation that may include a mapping of features to behavior classifications.

In a further aspect, the computing device may include means for replacing an existing behavior model with the received behavior model, and means for linking the received behavior model to the existing behavior analyzer engine so that when the existing behavior analyzer engine performs analysis operations it does so using the received behavior model.

In a further aspect, the computing device may include means for updating an existing behavior model with information included in the received behavior model, and means for linking the updated behavior model to the existing behavior analyzer engine so that when the existing behavior analyzer engine performs analysis operations it does so using the updated behavior model.

In a further aspect, the computing device may include means for receiving a plurality of behavior models from a plurality of public networks, and means for updating at least one existing behavior model with information included in one or more of the received plurality of behavior models.

In a further aspect, means for receiving the behavior model from the application download service may include means for receiving the behavior model from one of a cloud service network server, an app store server, a web server identified via uniform resource locator address, and a file transfer protocol service network server.

In a further aspect, means for receiving the behavior model from the application download service may include means for accessing and authenticating an online app store by the mobile device processor, means for downloading a menu of behavior models available for download or update from the online app store, means for receiving in the mobile device processor a user selection input, means for requesting download or update of a user-selected behavior model from the online app store, and means for receiving the requested user-selected behavior model in a download buffer.

In a further aspect, means for installing the received behavior model in conjunction with the existing behavior analyzer engine may include means for validating the received behavior model, means for installing the validated behavior model in memory, and means for registering the installed behavior model with an observer module.

In a further aspect, means for using the installed behavior model to monitor one or more mobile device behaviors may include means for observing mobile device behaviors over a period of time, means for identifying mobile device behaviors that are inconsistent with normal mobile device operations based on observing mobile device behaviors over the period of time, means for generating a behavior vector based on mobile device behaviors that are identified as inconsistent with the normal mobile device operations, and means for comparing the generated behavior vector to the installed behavior model to determine whether the identified mobile device behaviors are benign, suspicious, or malicious. In a further aspect, the computing device may include means for receiving a new behavior model that identifies additional factors and data points as being relevant to enabling the mobile device processor to better determine whether a mobile device behavior is benign or malicious, means for updating the installed behavior model with information included in the new behavior model in response to determining that an identified mobile device behavior is suspicious, and means for comparing the generated behavior vector to the installed behavior model to determine whether the identified mobile device behaviors are benign, suspicious, or malicious.

Further aspects include a mobile computing device having a processor configured with processor-executable instructions to perform operations including receiving a behavior model from an application download service that identifies factors and data points most relevant to enabling the processor to better determine whether a mobile device behavior is benign or malicious, installing the received behavior model in conjunction with an existing behavior analyzer engine, and using the installed behavior model to monitor one or more mobile device behaviors.

In an aspect, the processor may be configured with processor-executable instructions to perform operations such that receiving the behavior model may include receiving a software application that identifies factors and data points most relevant to enabling the processor to better determine whether a mobile device behavior is benign or malicious. In a further aspect, the processor may be configured with processor-executable instructions to perform operations such that receiving the behavior model may include receiving an XML file that identifies factors and data points most relevant to enabling the processor to better determine whether a mobile device behavior is benign or malicious. In a further aspect, the processor may be configured with processor-executable instructions to perform operations such that receiving the behavior model may include receiving a finite state machine representation that includes a mapping of features to behavior classifications.

In a further aspect, the processor may be configured with processor-executable instructions to perform operations that include replacing an existing behavior model with the received behavior model, and linking the received behavior model to the existing behavior analyzer engine so that when the existing behavior analyzer engine performs analysis operations it does so using the received behavior model.

In a further aspect, the processor may be configured with processor-executable instructions to perform operations that include updating an existing behavior model with information included in the received behavior model, and linking the updated behavior model to the existing behavior analyzer engine so that when the existing behavior analyzer engine performs analysis operations it does so using the updated behavior model.

In a further aspect, the processor may be configured with processor-executable instructions to perform operations that include receiving a plurality of behavior models from a plurality of public networks, and updating at least one existing behavior model with information included in one or more of the received plurality of behavior models.

In a further aspect, the processor may be configured with processor-executable instructions to perform operations such that receiving the behavior model from the application download service may include receiving the behavior model from one of a cloud service network server, an app store server, a web server identified via uniform resource locator address, and a file transfer protocol service network server.

In a further aspect, the processor may be configured with processor-executable instructions to perform operations such that receiving the behavior model from the application download service may include accessing and authenticating an online app store, downloading a menu of behavior models available for download or update from the online app store, receiving a user selection input, requesting download or update of a user-selected behavior model from the online app store, and receiving the requested user-selected behavior model in a download buffer.

In a further aspect, the processor may be configured with processor-executable instructions to perform operations such that installing the received behavior model in conjunction with the existing behavior analyzer engine may include validating the received behavior model, installing the validated behavior model in memory, and registering the installed behavior model with an observer module.

In a further aspect, the processor may be configured with processor-executable instructions to perform operations such that using the installed behavior model to monitor one or more mobile device behaviors may include observing mobile device behaviors over a period of time, identifying mobile device behaviors that are inconsistent with normal mobile device operations based on observing mobile device behaviors over the period of time, generating a behavior vector based on mobile device behaviors that are identified as inconsistent with the normal mobile device operations, and comparing the generated behavior vector to the installed behavior model to determine whether the identified mobile device behaviors are benign, suspicious, or malicious. In a further aspect, the processor may be configured with processor-executable instructions to perform operations that include receiving a new behavior model that identifies additional factors and data points as being relevant to enabling the processor to better determine whether a mobile device behavior is benign or malicious, updating the installed behavior model with information included in the new behavior model in response to determining that an identified mobile device behavior is suspicious, and comparing the generated behavior vector to the updated behavior model to better determine whether the identified suspicious mobile device behavior is benign or malicious.

Further aspects include a non-transitory computer readable storage medium having stored thereon processor-executable software instructions configured to cause a mobile device processor to perform operations that include receiving a behavior model from an application download service, the received behavior model identifying factors and data points most relevant to enabling the mobile device processor to better determine whether a mobile device behavior is benign or malicious, installing the received behavior model in conjunction with an existing behavior analyzer engine, and using the installed behavior model to monitor one or more mobile device behaviors.

In an aspect, the stored processor-executable software instructions may be configured to cause the mobile device processor to perform operations such that receiving the behavior model may include receiving a software application that identifies factors and data points most relevant to enabling the mobile device processor to better determine whether a mobile device behavior is benign or malicious. In a further aspect, the stored processor-executable software instructions may be configured to cause the mobile device processor to perform operations such that receiving the behavior model may include receiving an XML file that identifies factors and data points most relevant to enabling the mobile device processor to better determine whether a mobile device behavior is benign or malicious. In a further aspect, the stored processor-executable software instructions may be configured to cause the mobile device processor to perform operations such that receiving the behavior model may include receiving a finite state machine representation that includes a mapping of features to behavior classifications.

In a further aspect, the stored processor-executable software instructions may be configured to cause the mobile device processor to perform operations that include replacing an existing behavior model with the received behavior model, and linking the received behavior model to the existing behavior analyzer engine so that when the existing behavior analyzer engine performs analysis operations it does so using the received behavior model. In a further aspect, the stored processor-executable software instructions may be configured to cause the mobile device processor to perform operations that include updating an existing behavior model with information included in the received behavior model, and linking the updated behavior model to the existing behavior analyzer engine so that when the existing behavior analyzer engine performs analysis operations it does so using the updated behavior model.

In a further aspect, the stored processor-executable software instructions may be configured to cause the mobile device processor to perform operations that include receiving a plurality of behavior models from a plurality of public networks, and updating at least one existing behavior model with information included in one or more of the received plurality of behavior models.

In a further aspect, the stored processor-executable software instructions may be configured to cause the mobile device processor to perform operations such that receiving the behavior model from the application download service may include receiving the behavior model from one of a cloud service network server, an app store server, a web server identified via uniform resource locator address, and a file transfer protocol service network server.

In a further aspect, the stored processor-executable software instructions may be configured to cause the mobile device processor to perform operations such that receiving the behavior model from the application download service may include accessing and authenticating an online app store, downloading a menu of behavior models available for download or update from the online app store, receiving a user selection input, requesting download or update of a user-selected behavior model from the online app store, and receiving the requested user-selected behavior model in a download buffer.

In a further aspect, the stored processor-executable software instructions may be configured to cause the mobile device processor to perform operations such that installing the received behavior model in conjunction with the existing behavior analyzer engine may include validating the received behavior model, installing the validated behavior model in memory, and registering the installed behavior model with an observer module.

In a further aspect, the stored processor-executable software instructions may be configured to cause the mobile device processor to perform operations such that using the installed behavior model to monitor one or more mobile device behaviors may include observing mobile device behaviors over a period of time, identifying mobile device behaviors that are inconsistent with normal mobile device operations based on observing mobile device behaviors over the period of time, generating a behavior vector based on mobile device behaviors that are identified as inconsistent with the normal mobile device operations, and comparing the generated behavior vector to the installed behavior model to determine whether the identified mobile device behaviors are benign, suspicious, or malicious. In a further aspect, the stored processor-executable software instructions may be configured to cause the mobile device processor to perform operations that include receiving a new behavior model that identifies additional factors and data points as being relevant to enabling the mobile device processor to better determine whether a mobile device behavior is benign or malicious, updating the installed behavior model with information included in the new behavior model in response to determining that an identified mobile device behavior is suspicious, and comparing the generated behavior vector to the updated behavior model to better determine whether the identified suspicious mobile device behavior is benign or malicious.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
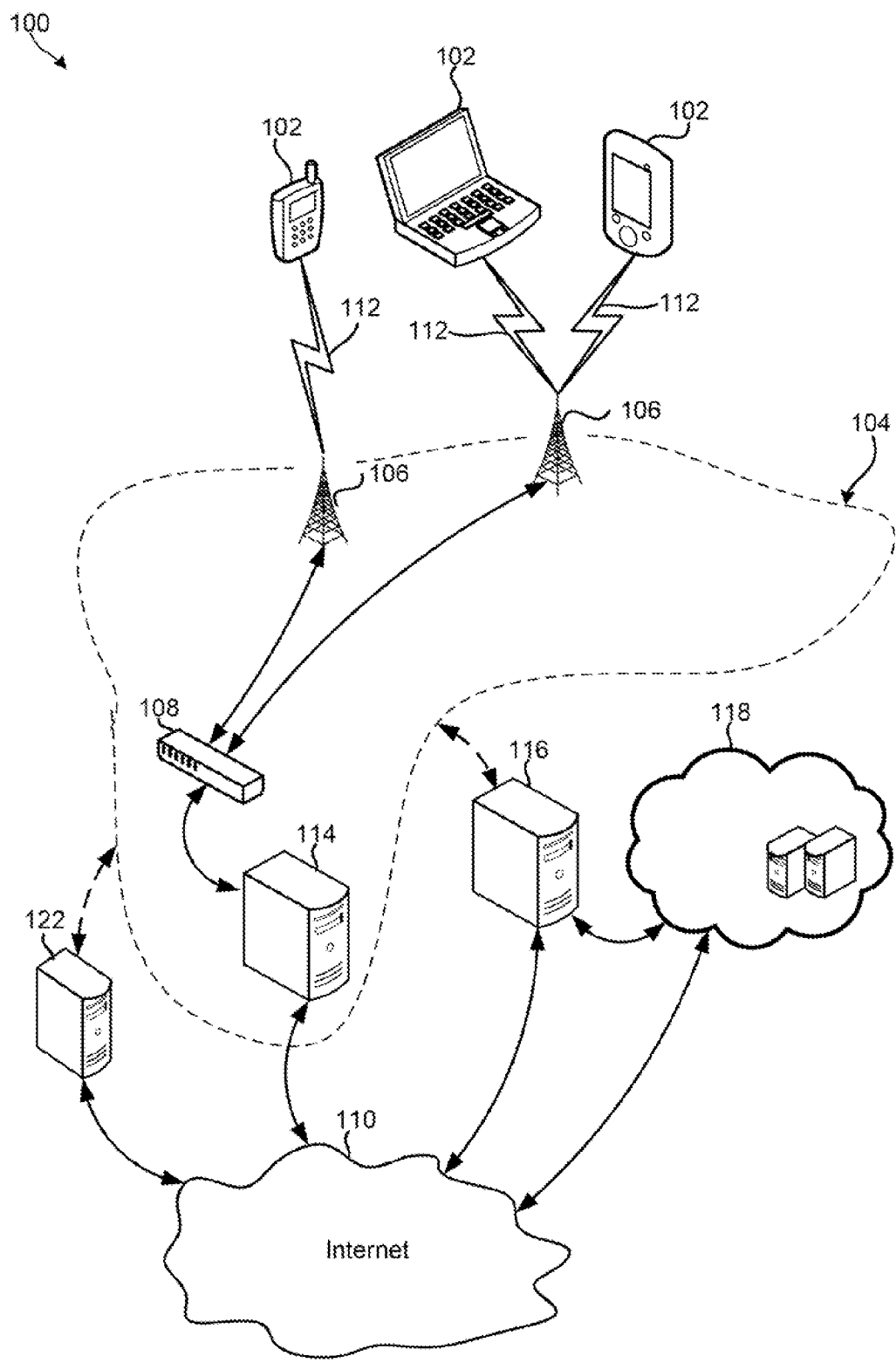
FIG. 1 is a communication system block diagram illustrating network components of an example telecommunication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The various aspects provide network servers, mobile devices, systems, and methods for efficiently identifying, classifying, modeling, preventing, and/or correcting the conditions and/or mobile device behaviors that often degrade a mobile device's performance, power utilization levels, network usage levels, security and/or privacy over time. By storing information on such conditions and corrective actions in a central database, such as the "cloud," and enabling mobile devices to access and use the information stored in this database, the various aspects enable mobile devices to react to performance-limiting and undesirable operating conditions much faster and with lower power consumption than if all such analyses were accomplished independently within each mobile device. In addition, the use of aspect application programming interfaces (APIs) and modules enable communication of behavior models, classifiers, and behavior information between the mobile device and multiple third parties, application stores, public networks, private networks, original equipment manufacturers (OEMs), telecommunications service providers, and others, and enable a behavior analysis engine of the mobile device to be updated frequently, work with multiple behavior or analyzer model providers, and/or receive updated models from one or more sources (e.g., multiple cloud services), at various times, and/or at varying frequencies. In particular, the aspect APIs and modules enable behavior models to be downloaded from the Internet or an application download service, such as an "app store," (e.g., Apple® App Store, Windows® Store, Google® Play, etc.), a cloud service or server, a URL address, an FTP server, etc. In various aspects, the mobile device may update or replace pre-existing or generated behavior models based on the information or models received from an application download service, such as a cloud server communicating with a client module in the mobile device.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs such as internet-of-things (IOT) connected devices.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and there are a large variety of factors that may contribute to the degradation in performance and power utilization levels of a mobile device over time, including poorly designed software applications, malware, viruses, fragmented memory, background processes, etc. Due to the number, variety, and complexity of these factors, it is often not feasible to evaluate all the various processes, behaviors, or factors (or combinations thereof) that may degrade performance and/or power utilization levels of the complex yet resource-constrained systems of modern mobile devices.

To provide better performance in view of these facts, the various aspects include mobile devices configured to work in conjunction with any number or combination of public and private cloud services/networks (e.g., an application store, anti-virus partner, security partner, etc.) to intelligently and efficiently identify factors that may contribute to the degradation in performance and power utilization levels of mobile devices over time. Such cloud services may provide computational offloading, crowd sourcing, as well as provide other benefits so that a mobile device may identify performance-degrading factors on the mobile device without consuming an excessive amount of processing, memory, or energy resources of the mobile device.

In an aspect, an observer process, daemon, module, or sub-system (herein collectively referred to as a "module") of the mobile device may instrument or coordinate various application programming interfaces (APIs), registers, counters or other available information or components (herein collectively "instrumented components") at various levels of the mobile device system, and collect behavior information from the instrumented components. In an aspect, the mobile device may also include an analyzer module and/or a classifier module. The observer module may communicate (e.g., via a memory write operation, function call, etc.) the collected behavior information to the classifier module and/or the analyzer module (e.g., via a memory write operation, etc.) of the mobile device, which may analyze and/or classify the collected behavior information, generate behavior vectors, generate spatial and/or temporal correlations based on the behavior vector and information collected from various other mobile device sub-systems, and determine whether a particular mobile device behavior, software application, or process is benign, suspicious, malicious, or performance-degrading.

The analyzer module and/or classifier module of the mobile device may be configured to perform real-time analysis operations, which may include performing, executing, and/or applying data, algorithms, and/or models to real time behavior information collected by the observer module to determine whether a mobile device behavior is benign, suspicious, malicious, or performance-degrading. The data, algorithms, and/or models applied by analyzer and/or classifier modules may be pre-installed on the mobile device, generated on the mobile device, and/or downloaded from or upgraded by any number or combination of public and private cloud services/networks, including third party vendors and application stores. Downloaded data, algorithms, and/or models may be installed in or linked to the analyzer and/or classifier modules in an install or update process so that when the analyzer and/or classifier modules perform real-time analysis operations they do so using the downloaded data, algorithms, and/or models.

Various aspects may include mobile devices configured with an interfaces module that facilitates communications between the mobile device and one or more private and/or public networks and services (e.g., application download service) and enables the analyzer module to work in conjunction with multiple cloud services. The interfaces module also increases the security and reliability of the mobile device by enabling the mobile device to work with one or more security cloud partners, models generated in the mobile device, and models from other partners (e.g., OEMs, network operators, etc.). The interfaces module also enables the mobile device to download or otherwise receive incremental updates to the data, algorithms, and/or models linked to the analyzer and classifier modules.

The interfaces module may also provide an application-level download mechanism that allows for the mobile device to be distributed with an observer module and working analyzer algorithms, and be capable of receiving machine learning or behavior models downloaded from an application download service or a third party at a later time. These aspects enable mobile device users to purchase up-to-date and targeted models that best meet the user's security and preferences. Also, these aspects enable installed models to be updated incrementally and/or through already deployed mechanisms for updating applications through app stores and other third-party software update mechanisms. In this matter, mobile devices may be configured with the most up to date analyzer and/or classifier models using existing software distribution and support infrastructures and without consuming an excessive amount of processing, memory, or energy resources of the mobile device.

In an aspect, the interfaces module may be configured to enable an application download service (e.g., server in a cloud network, app store, etc.) to send data/behavior models to the mobile device. The mobile device may receive and implement, apply, or use the data/behavior models to identify and correct suspicious, malicious or performance-degrading mobile device behaviors. This may be achieved by the mobile device replacing or updating an all or portions of existing data/behavior model of the mobile device, and applying the new/updated models to information collected in the mobile device. The data/behavior models may be classifiers, models of power consumption provided by the OEM, models of network traffic usage provided by network operators, models of malicious activity provided by a security partner, reduced feature models (RFMs), etc.

In various aspects, the mobile device may be configured to communicate with a network server that includes an offline classifier and/or a real-time online classifier. The offline classifier may generate robust data/behavior models based on information previously received from a cloud service/network. The real-time online classifier may generate lean data/behavior models based on analyzing the larger and more complicated behavior models generated from information received from the cloud service/network. Lean data/behavior models may include models that consider or evaluate a subset of information and/or limited number of state conditions and behaviors that are likely to indicate suspicious or malicious behavior, while reducing the amount of data that the analyzer must process. Both the online and offline classifiers may generate data/behavior models that include a reduced subset of information made available by the cloud service/network for a particular mobile device. In an aspect, generating the lean data/behavior models may include generating one or more reduced feature models (RFMs) and/or leveraging a crowd source model.

In various aspects, mobile devices, including mobile devices configured with downloaded analyzer/classifier models, may forward behavior vectors, analysis results and other behavior analysis data to a network server, such as a server supporting a downloaded analyzer/classifier model. This feedback of behavior vectors and/or analysis results may occur in real time or when convenient, and may enable the network server to develop and refine the analyzer/classifier model, which may then be offered to mobile devices through a public cloud network, such as via an app store infrastructure as application updates.

In an aspect, the mobile device may be configured to leverage a crowd sourced model received from a network server via a public cloud network or an app store-type mechanism. The crowd sourced model may be generated in the network server via the server performing, executing, and/or applying machine learning and/or context modeling techniques to behavior information and/or results of behavior analyses provided by many mobile devices. For example, the network server may receive a large number of reports from many mobile devices and analyze, consolidate or otherwise turn such crowd-sourced information into useable information, particularly a lean data set or focused behavior models that can be used or accessed by all mobile devices.

In an aspect, the network server may send incremental updates to the mobile device, and the mobile device may be configured to update its models based on the incremental updates received from the network server. For example, if the network server includes a database that stores ten thousand behavioral rules or records, and a new rule/record is added to the database (e.g. via crowd sourcing data received from many mobile devices), the network server may be configured to send only a portion of a model and/or the new rule or record (as opposed to all ten thousand records) to the mobile device. The mobile device may receive the new rule/record and update its existing models to include the rule. This downloading of new rules/records and updates to existing models may be accomplished via an app store interface.

In an aspect, the network server may continuously reevaluate existing lean data/behavior models as new behavior/analysis reports are received from mobile devices, and/or generate new or updated lean data/behavior models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

In an aspect, the network server may be configured to generate the lean data/behavior models to include an initial feature set (e.g., an initial reduced feature model) and one or more subsequent feature sets (e.g., subsequent reduced feature models). The initial feature set may include information determined to have a highest probability of enabling the classifier module of the mobile devices to better determine whether a particular mobile device behavior, software application, or process is malicious/performance-degrading or benign. Each subsequent feature set may include information determined to have the next highest probability of conclusively determining that the mobile device behavior, software application, or process is malicious/performance-degrading or benign. Each subsequent feature set may include a larger dataset than its preceding feature set, and thus the performance and power consumption costs associated with applying the data/behavior models may increase progressively for each subsequent feature set.

In an aspect, the classifier module of the mobile device may include or implement progressive behavior models (or classifiers) that enable the mobile device processor to evaluate the mobile device behaviors in stages. For example, the classifier module may be configured to first apply a lean data/behavior model that includes the initial feature set, then models that include progressively larger feature sets until the classifier module determines that a mobile device behavior is benign or malicious/performance-degrading. The classifier module may then send the results of its operations and/or success rates associated with the application of each model to the network server. The network server may use such results to update its lean data/behavior models (e.g., the features sets included in each model, etc.), thereby refining the data and/or models based on the results/success rates of all reporting mobile devices. The network server may then make the updated lean data/behavior models available to mobile devices as new model apps or upgrades to previously downloaded apps, so mobile devices have access to the refined lean data/behavior models. In this manner, mobile devices can quickly benefit from the behaviors and conclusions of other mobile devices leveraging the software delivery and update mechanism provided by an app store infrastructure.

In an aspect, the network server may be configured to continuously update the online and offline classifiers, model generators, and/or cloud model. The network server may be configured to intelligently determine when the changes are substantial enough to warrant generating new models and when the changes may be ignored. For example, the network server may receive updates from many different mobile devices, perform machine learning operations to generate a first family of classifiers, determine whether there are enough changes to the generated first family of classifiers to warrant generating new models, determine which features in the generated first family of classifiers are the best features when it is determined that there are enough changes to the first family of classifiers, generate a second family of classifiers based on the best features, determine whether there are enough changes to the generated second family of classifiers, and generate/update mobile device classifier data/behavior models when it is determined that there are enough changes to the second family of classifiers.

In an aspect, the interfaces module may be configured to enable the mobile device to receive fewer or less frequent updates than those that are typically received from a private cloud service. This allows the mobile device to receive updated models at the user's discretion, in a flexible manner and without requiring constant connectivity to the cloud service.

In various aspects, all or portions of the analyzer module may be downloaded from multiple sources, pre-loaded on the mobile device, downloaded into a client application of the mobile device, and downloaded as a software application form an application download service (e.g., app store, etc.).

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include private and public network servers 116, 122 connected to the telephone network 104 and to the Internet 110. The connection between the network servers 116, 122 and the telephone network 104 may be through the Internet 110, through a private network (as illustrated by the dashed arrows), or any other public or semi-public network (e.g., application download framework). In an aspect, a private network server 116 may also be implemented as a server within the network infrastructure of a cloud service provider network 118. Communication between the network servers 116, 122 and the mobile devices 102 may be achieved through the telephone network 104, the internet 110, private network (not illustrated), or any combination thereof.

The network servers 116, 122 may send data/behavior models to the mobile device 102, which may receive and use lean data/behavior models to identify suspicious or performance-degrading mobile device behaviors, software applications, processes, etc. The network servers 116, 122 may also send classification and modeling information to the mobile devices 102 to replace, update, create and/or maintain mobile device data/behavior models.

The mobile device 102 may collect behavioral, state, classification, modeling, success rate, and/or statistical information in the mobile device 102, and send the collected information to the network server 116 (e.g., via the telephone network 104) for analysis. The network server 116 may use information received from the mobile device 102 to update or refine the data/behavior models or the classification/modeling information to include a more targeted and/or reduced subset of features.

Figure 2A:
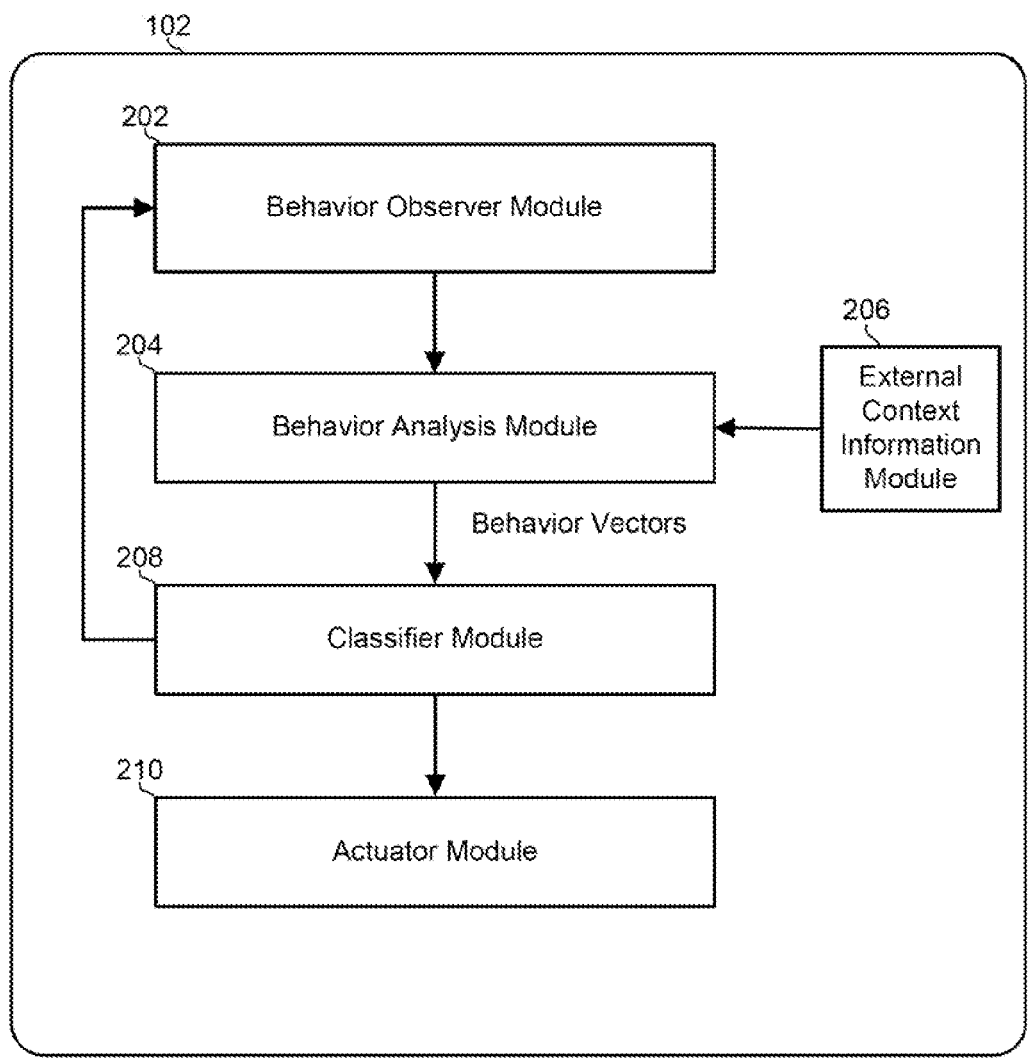
FIGS. 2A-2B are block diagrams illustrating example logical components and information flows in aspect mobile devices configured to determine whether a particular mobile device behavior, software application, or process is performance-degrading, suspicious, or benign.

FIG. 2A illustrates example logical components and information flows in an aspect mobile device 102 configured to determine whether a particular mobile device behavior, software application, or process is malicious/performance-degrading, suspicious, or benign. In the example illustrated in FIG. 2A, the mobile device 102 includes a behavior observer module 202, a behavior analyzer module 204, an external context information module 206, a classifier module 208, and an actuator module 210. In an aspect, the classifier module 208 may be implemented as part of the behavior analyzer module 204. In an aspect, the behavior analyzer module 204 may be configured to generate one or more classifier modules 208, each of which may include one or more classifiers.

Each of the modules 202-210 may be implemented in software, hardware, or any combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The behavior observer module 202 may be configured to instrument or coordinate application programming interfaces (APIs) and other components (e.g., registers, counters, etc.) at various levels/modules of the mobile device, and monitor/observe mobile device operations and events (e.g., system events, state changes, etc.) at the various levels/modules via the instrumented components, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The behavior observer module 202 may monitor/observe mobile device operations and events by collecting information from the instrumented components, including information pertaining to library API calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the number or degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 202 may also monitor/observe actions or operations of software applications, software downloads from an application download server (e.g., Apple® App Store server, Google® Play server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc. As the behavior observer module 202 is an internal process, its observations of information and content of communications should not compromise user privacy, and the objective of curtailing or otherwise mitigating malicious behavior should function to protect user personal and confidential information from unauthorized distribution by malware.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a network server 116 and/or a component in a cloud service or network 118. In an aspect, the initial set of behaviors/factors may be specified in data/behavior models received from the network server 116 or cloud service/network 118. In an aspect, the initial set of behaviors/factors may be specified in a reduced feature model (RFMs).

While the behavior observe module 202 may be provisioned with the mobile device manufacturer or service provider, in an aspect the behavior observe module 202 may be replaced, supplemented or updated by a downloaded behavior observe application from an app store. In other words, in this aspect, a downloaded module may include a behavior observe module, a behavior analyzer module, and/or classifier module.

The behavior analyzer module 204 and/or classifier module 208 may receive the observations from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 and/or classifier module 208 may include intelligence for utilizing a limited set of information (i.e., coarse observations) to identify behaviors, processes, or programs that are contributing to (or are likely to contribute to) the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to the classifier module 208 for further analysis.

The classifier module 208 may receive the behavior vectors and compare them to one or more behavior modules to determine whether a particular mobile device behavior, software application, or process is performance-degrading/malicious, benign, or suspicious.

When the classifier module 208 determines that a behavior, software application, or process is malicious or performance-degrading, the classifier module 208 may notify the actuator module 210, which may perform various actions or operations to correct mobile device behaviors determined to be malicious or performance-degrading and/or perform operations to heal, cure, isolate, notify the user or otherwise fix the identified problem.

When the classifier module 208 determines that a behavior, software application, or process is suspicious, the classifier module 208 may notify the behavior observer module 202, which may adjust the adjust the granularity of its observations (i.e., the level of detail at which mobile device behaviors are observed) and/or change the behaviors that are observed based on information received from the classifier module 208 (e.g., results of the real-time analysis operations), generate or collect new or additional behavior information, and send the new/additional information to the behavior analyzer module 204 and/or classifier module 208 for further analysis/classification. Such feedback communications between the behavior observer module 202 and the classifier module 208 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication also enables the mobile device 102 to adjust or modify the data/behavior models locally in the mobile device without consuming an excessive amount of the mobile device's processing, memory, or energy resources.

In an aspect, the behavior observer module 202 and the behavior analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 202 enables the mobile device 102 to efficiently identify and prevent problems from occurring on mobile devices without requiring a large amount of processor, memory, or battery resources on the device.

Figure 2B:
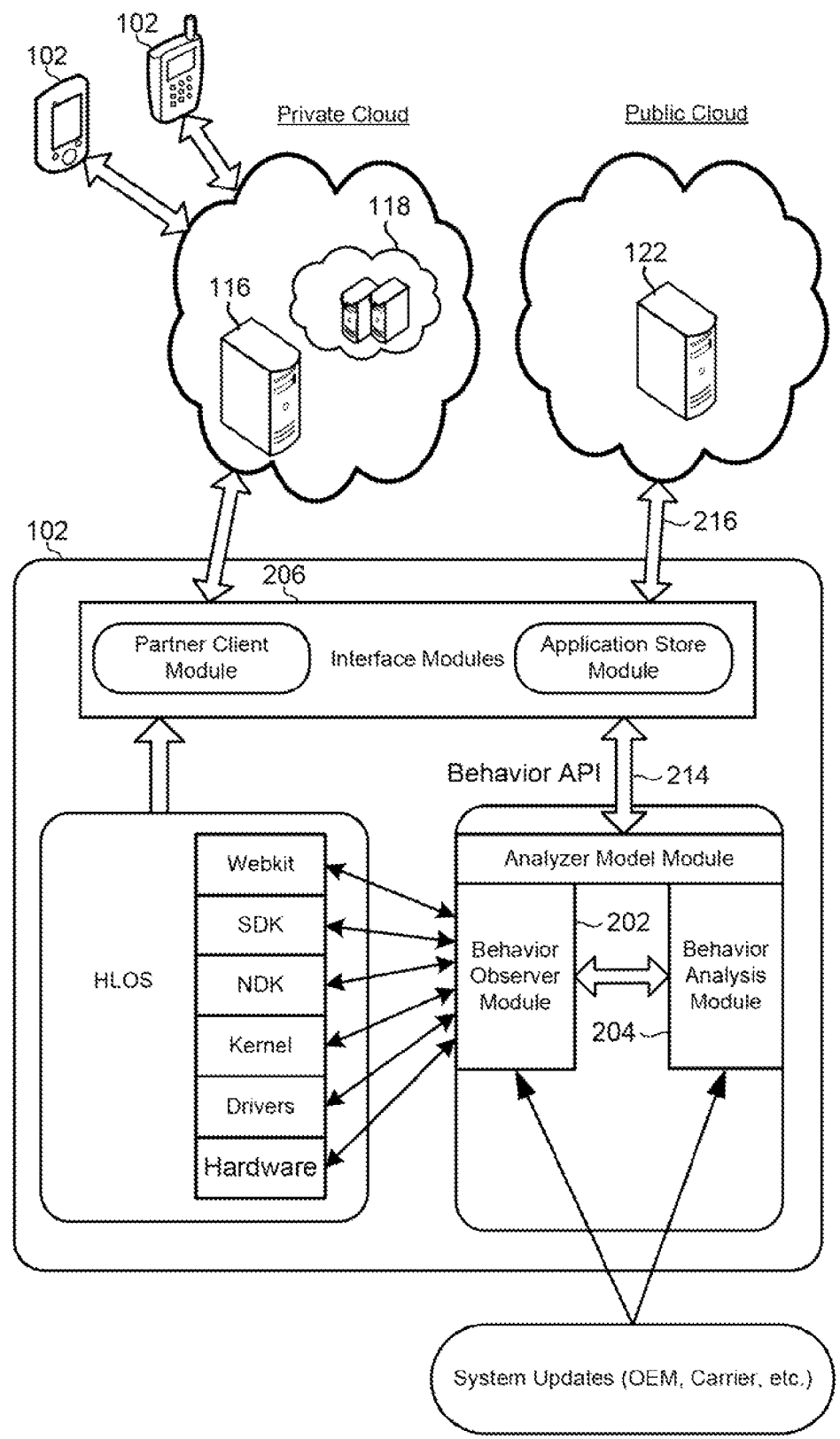

FIG. 2B illustrates other example logical components and information flows in an aspect mobile device 102 configured to determine whether behaviors, software applications, and/or processes are malicious, performance-degrading, suspicious, or benign. In the example illustrated in FIG. 2B, the mobile device 102 includes a behavior observer module 202, a behavior analyzer module 204, interface modules 206, and a behavior API 214, which may be implemented as a module or component. The interface modules may include a partner client module and an application store module. Each of the modules 202-208, 214 may be implemented in software, hardware, or any combination thereof. In various aspects, the modules 202-208, 214 may be implemented within parts of a high-level operating system 210 (e.g., within the kernel, in the kernel space, in the user space, etc.), within separate programs or applications, in specialized hardware buffers or processors, or any combination thereof. In an aspect, one or more of the modules 202-208, 214 may be implemented as software instructions executing on one or more processors of the mobile device 102.

The behavior observer module 202 may be configured to perform cross-layer observations on various mobile device modules and sub-systems encompassing webkit, SDK, NDK, kernel, drivers, browsers, web-layer software and hardware in order to characterize the mobile device behavior.

The behavior observer module 202 may monitor/observe mobile device behaviors based on the received model, generate observations, and send the observations to the behavior analyzer module 204. The behavior analyzer module 204 may perform real-time analysis operations, which may include applying data/behavior models to behavior information collected by the behavior observer module 202 to determine whether a mobile device behavior is benign, suspicious, or malicious/performance-degrading. The behavior models may be generated in the mobile device, or may be received from an external source, such as an application download service (e.g., Apple® App Store, Windows® Store, Google® Play, etc.). For example, in various aspects, the behavior analyzer module 204 may receive behavior models from a third party network server 116, a component in a cloud service or network 118, or an application download server 122 via the interface modules 206.

The interface modules 206 may store (or have access to a database or server that stores) collaboration information and/or data-structures suitable for interpreting models received from an application download server 122. Such collaboration information/data-structures may include a dictionary database of the behavior features and grammar for interpreting, analyzing, combining, and/or applying the behavior models, and/or various representations (e.g. a finite state machine, a decision tree, etc.) that map the behavior features to a classification or analysis of the mobile device behaviors, applications or processes. Each representation may include one or more data-structures, may describe a set of complex relationships, mappings, interconnections, dependencies, transformations and/or states, and may organize information so as to create new elements of knowledge. A representation may describe a mobile device behavior and its features, behavior classifications, and relationships with other behaviors, classifications, or systems.

In an aspect, the interface modules 206 may be configured to decode, interpret, evaluate, combine, organize and/or encode observed behavior information, mobile device features, and data models into a communication message suitable for transmission to the application download server 122 via a communication link 216 and/or suitable for sending to the behavior observer and analyzer modules via the behavior API 214.

In various aspects, the interface modules 206 may be configured to allow an application download server 122 to interact with behavior observer and analyzer modules 202, 204 in mobile devices 102 via the behavior API 214 module/component. For example, an application developer with granted user permissions may access the behavior observation and analysis modules 202, 204 via the interface modules 206 to perform operations to: discover the capabilities of the mobile device; perform client registration and authentication operations on the device; access a list of mobile device behaviors or features that may be observed/analyzed in the mobile device; generate, populate, and/or update a finite state machine description of a mapping of features to benign, suspicious, or malicious/performance-degrading behaviors; issue requests for additional, more detailed, or more targeted observations of mobile device behaviors; issue requests to back-off from observing specific applications (e.g., a white list); issue requests to receive behavior logs (good, bad, suspicious, etc.); issue requests that cause the mobile device to initiate a corrective action (e.g., via the actuation module 208); and/or perform other similar operations in the mobile device.

The classifier module 208 may be configured to communicate the results of its real-time analysis operations to the behavior observer module 202 when the classifier module 208 determines that a device behavior is suspicious. The behavior observer module 202 may adjust the granularity of its observations (i.e., the level of detail at which mobile device behaviors are observed) and/or change the behaviors that are observed based on information received from the classifier module 208 (e.g., based on the results of the real-time analysis operations), generate or collect new or additional behavior information, and send the new/additional information to the classifier module for further analysis/classification (e.g., in the form of new models). In this manner, the mobile device 102 may recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity.

The mobile device 102 may the send the results of its operations and/or success rates associated with the application of models to the network server 116. The network server 116 may generate training data (e.g., via a training data module) based on the results/success rates for use by a model generator, which may generate updated models and send the updated models to the mobile device 102.

Figure 3:
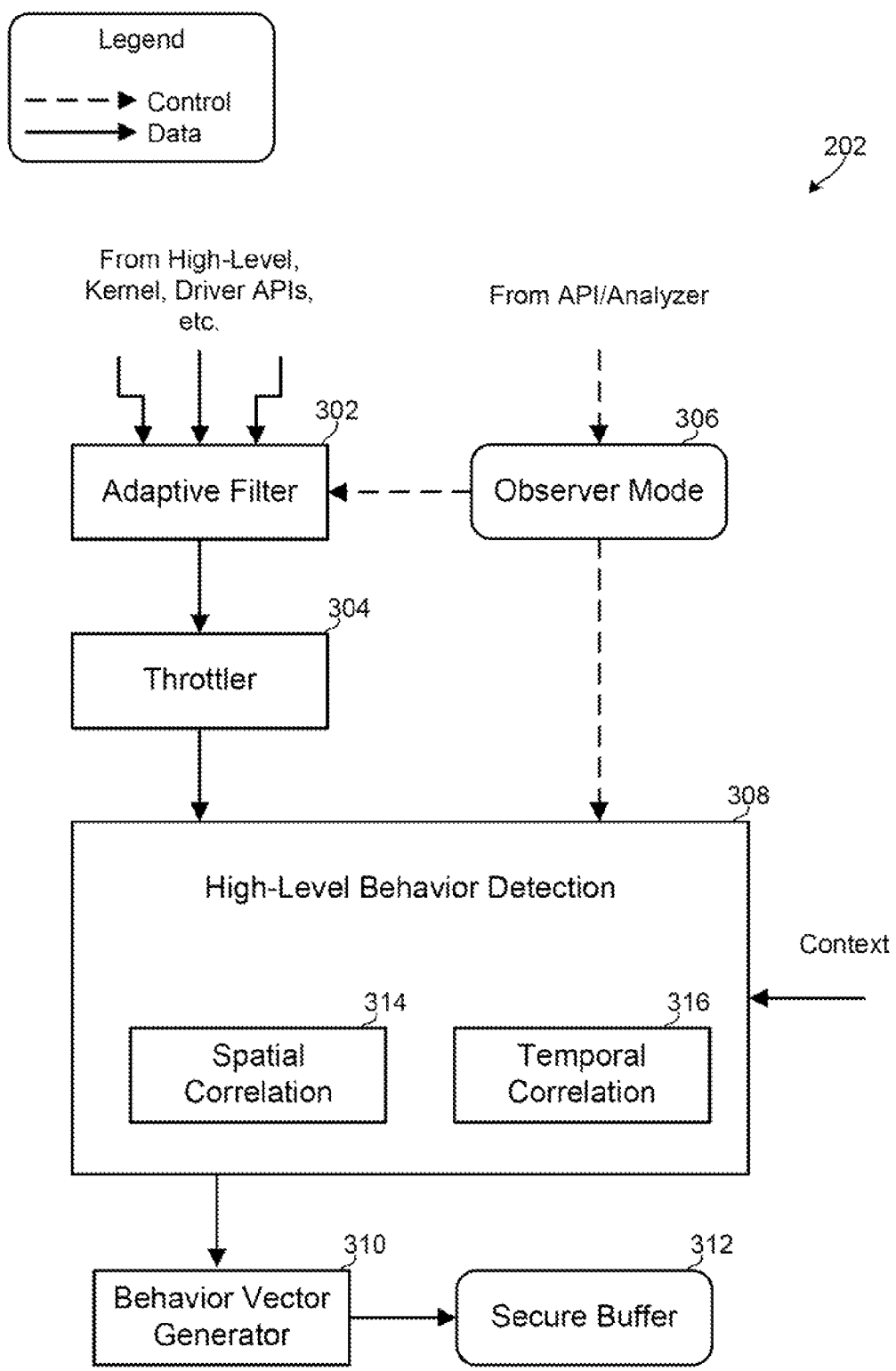
FIG. 3 is a block diagram illustrating example logical components and information flows in an observer module configured to perform dynamic and adaptive observations in accordance with an aspect.

FIG. 3 illustrates example logical components and information flows in a behavior observer module 202 of a computing system configured to collect behavior information that may be applied to models received from an application download service in accordance with an aspect. The behavior observer module 202 may include an adaptive filter module 302, a throttle module 304, an observer mode module 306, a high-level behavior detection module 308, a behavior vector generator 310, and a secure buffer 312. The high-level behavior detection module 308 may include a spatial correlation module 314 and a temporal correlation module 316.

The observer mode module 306 may receive control information from various sources, which may include an analyzer unit (e.g., the behavior analyzer module 204 described above with reference to FIG. 2), an application API, and/or any instrumented component. The observer mode module 306 may send control information pertaining to various observer modes to the adaptive filter module 302 and the high-level behavior detection module 308.

The adaptive filter module 302 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 304, which may be responsible for controlling the amount of information flowing from the filter to ensure that the high-level behavior detection module 308 does not become flooded or overloaded with requests or information.

The high-level behavior detection module 308 may receive data/information from the throttle module 304, control information from the observer mode module 306, and context information from other components of the mobile device. The high-level behavior detection module 308 may use the received information to perform spatial and temporal correlations to detect or identify high-level behaviors that may cause the device to perform at sub-optimal levels. The results of the spatial and temporal correlations may be sent to the behavior vector generator 310, which may receive the correlation information and generate a behavior vector that describes the behaviors of a particular process, application, or sub-system. In a non-limiting aspect, the behavior vector generator 310 may generate the behavior vector such that a high-level behavior of a particular process, application, or sub-system may be an element of the behavior vector. In an aspect, the generated behavior vector may be stored in a secure buffer 312. Examples of high-level behavior detection may include detection of the existence of a particular event, the amount or frequency of another event, the relationship between multiple events, the order in which events occur, time differences between the occurrence of certain events, etc.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide variety of sources.

As discussed above, the behavior observer module 202 may perform adaptive observation techniques and control the observation granularity based on information received from a variety of sources. For example, the high-level behavior detection module 308 may receive information from the throttle module 304, the observer mode module 306, and context information received from other components (e.g., sensors) of the mobile device. As an example, a high-level behavior detection module 308 performing temporal correlations might detect that a camera has been used and that the mobile device is attempting to upload the picture to a server. The high-level behavior detection module 308 may also perform spatial correlations to determine whether an application on the mobile device took the picture while the device was holstered and attached to the user's belt or if a background process triggered the camera snapshot event without user interaction. The high-level behavior detection module 308 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 308 may recognize this as a potentially threatening behavior and initiate an appropriate response (e.g., shutting off the camera, sounding an alarm, etc.).

In an aspect, the behavior observer module 202 may be implemented in multiple parts.

Figure 4:
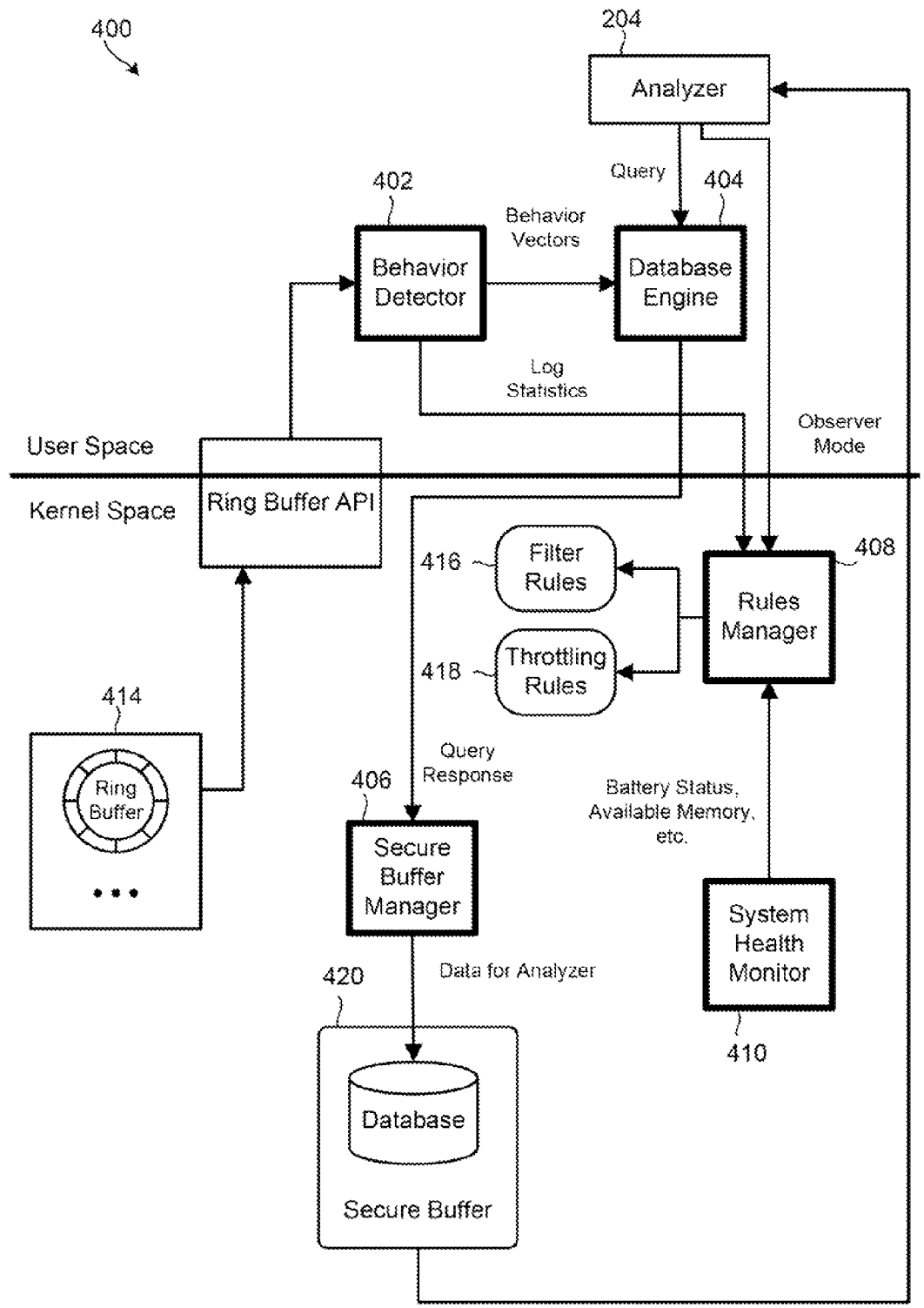
FIG. 4 is a block diagram illustrating logical components and information flows in a computing system implementing observer daemons in accordance with another aspect.

FIG. 4 illustrates logical components and information flows in a computing system 400 implementing an aspect observer daemon. In the example illustrated in FIG. 4, the computing system 400 includes a behavior detector 402 module, a database engine 404 module, and a behavior analyzer module 204 in the user space, and a ring buffer 414, a filter rules 416 module, a throttling rules 418 module, and a secure buffer 420 in the kernel space. The computing system 400 may further include an observer daemon that includes the behavior detector 402 and the database engine 404 in the user space, and the secure buffer manager 406, the rules manager 408, and the system health monitor 410 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically may identify the relevant behaviors that are to be observed, and dynamically determine the level of detail at which the identified behaviors are to be observed. The identified behaviors may be used as part of a crowd sourcing model so that information learned on a first mobile device may be used to benefit other mobile devices, even before any of the other mobile devices encounter the same or similar behavior.

Figure 5:
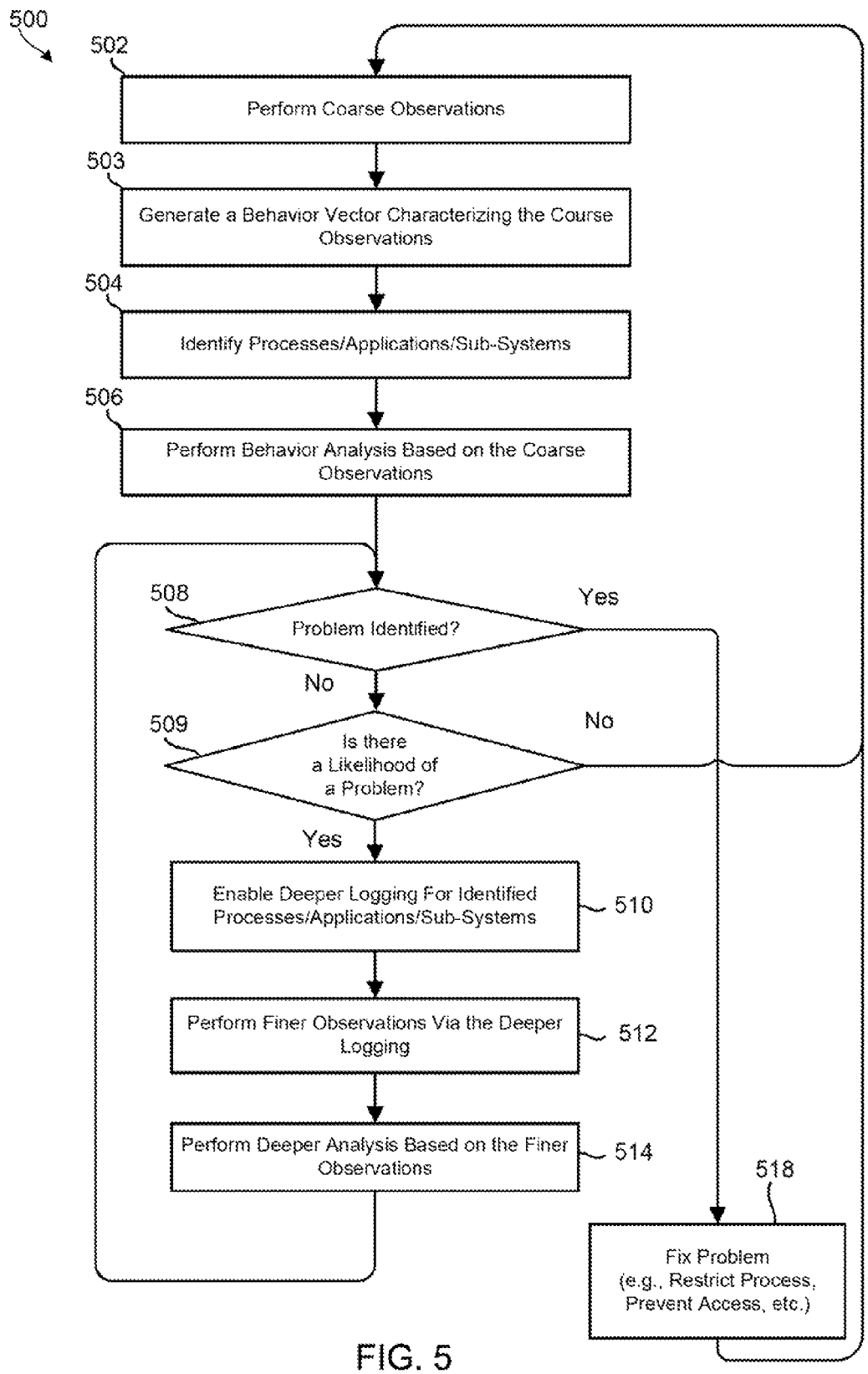
FIG. 5 is a process flow diagram illustrating an aspect method for performing adaptive observations on mobile devices.

FIG. 5 illustrates an example method 500 for performing dynamic and adaptive observations in accordance with an aspect. In block 502, the mobile device processor may perform coarse observations by monitoring/observing a subset of large number factors/behaviors that could contribute to the mobile device's degradation. In block 503, the mobile device processor may generate a behavior vector characterizing the coarse observations and/or the mobile device behavior based on the coarse observations. In block 504, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 506, the mobile device processor may perform behavioral analysis operations based on the coarse observations. In aspect, as part of blocks 503 and 504, the mobile device processor may perform one or more of the operations discussed above with reference to FIGS. 2-4.

In determination block 508, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 508="Yes"), in block 518, the processor may initiate a process to correct the behavior and return to block 502 to perform additional coarse observations.

When the mobile device processor determines that the suspicious behaviors or potential problems cannot be identified and/or corrected based on the results of the behavioral analysis (i.e., determination block 508="No"), in determination block 509 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 509="No"), the processor may return to block 502 to perform additional coarse observations.

When the mobile device processor determines that there is a likelihood that suspicious behaviors or potential problems exist and/or are detectable (i.e., determination block 509="Yes"), in block 510, the mobile device processor may perform deeper logging on the identified subsystems, processes or applications. In block 512, the mobile device processor may perform deeper and more detailed observations on the identified subsystems, processes or applications based on the deeper logging. In block 514, the mobile device processor may perform further and/or deeper behavioral analysis based on the deeper and more detailed observations.

In determination block 508, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 508="No"), the processor may repeat the operations in blocks 510-514 until the level of detail is fine enough to identify the problem or until it is determined that the problem cannot be identified with additional detail or that no problem exists.

Figure 6:
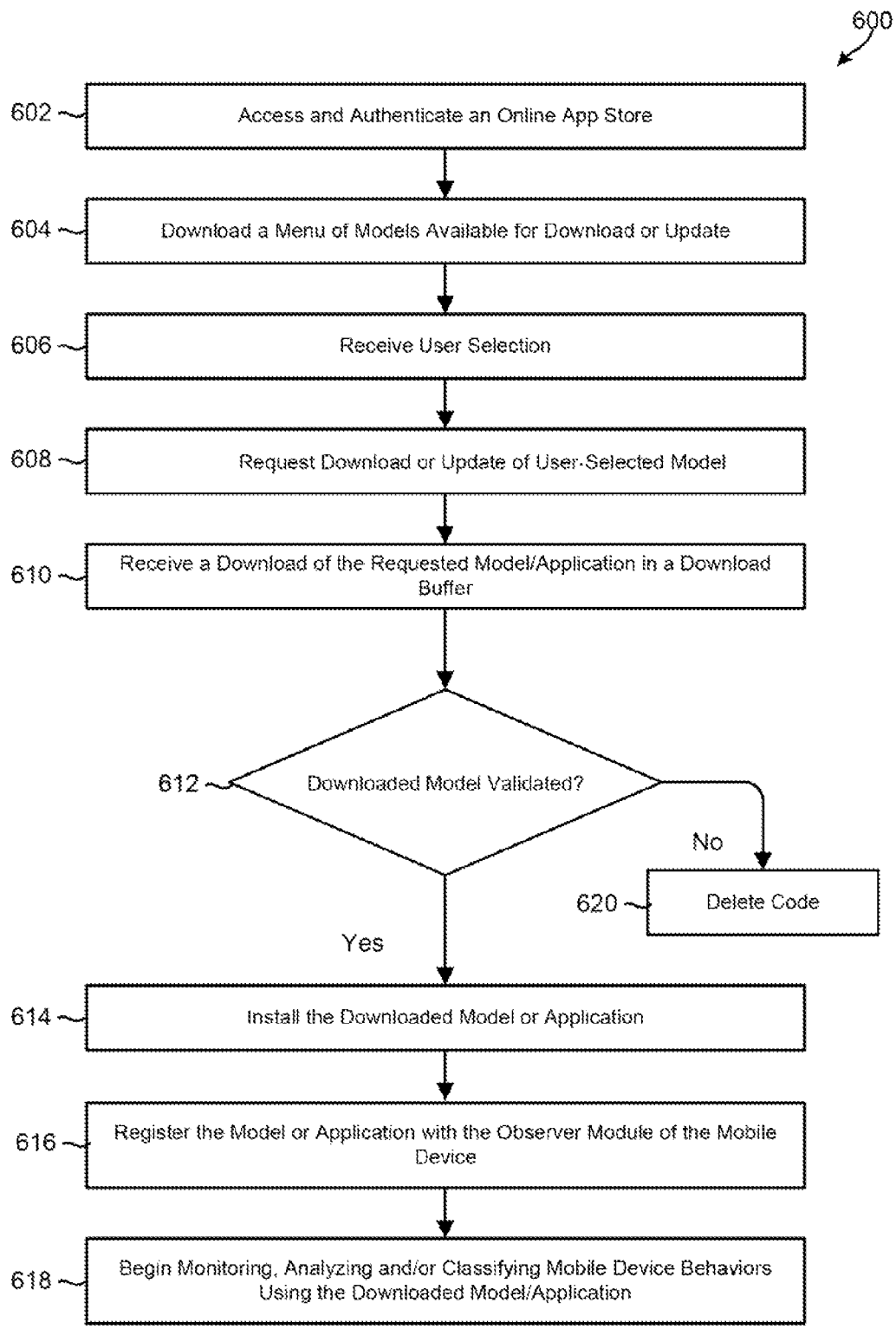
FIG. 6 is a process flow diagram illustrating an aspect method for downloading a behavior analysis module/application from an application store to a mobile device.

FIG. 6 illustrates an aspect method 600 for downloading a behavior observer/analyzer/classifier module or a behavior model to a mobile device from an application store. In block 602, the mobile device may access an online app store via a network, such as the Internet, in response to a user input. As part of block 602, the mobile device may also perform authentication routines to confirm that the accessed application store is indeed a trustworthy site, and not a source of malware or a server executing a man-in-the-middle attack.

Such authentication processes may be particularly necessary for the various aspects in order to protect the mobile device from malware since the aspect models/applications are intended to protect the mobile device from performance-degrading behaviors and software. Signing the applications and data and verifying their signatures on the mobile device is one method which can be used for achieving trust.

Once the application store is authenticated, the mobile device may download a menu of models available for download or update and present the menu on a display of the mobile device in block 604. The mobile device may alternatively upload its configuration preferences to the application store. In block 606 the mobile device processor may receive a user selection input, and in block 608 send a download or update request to the application store based on the user's selection or device's pre-installed configuration.

In block 610, the mobile device processor may receive a download of the requested model or application and store the code in a buffer portion of memory. In determination block 612, the mobile device processor may perform software verification and validation processes on the downloaded code to determine whether has been accurately downloaded and has not been modified since it was validated by a trusted third party. Mechanisms for verifying and validating downloaded code are well known in the art and may be implemented in determination block 612. If the downloaded code is not verified or validated (i.e., determination block 612="No"), in block 620, the processor may delete the code from buffer memory.

If the downloaded code is verified and validated (i.e., determination block 612="Yes"), the processor may install the downloaded model or application in block 614. This installation process may involve copying the code from the buffer into a proper portion of memory for execution. This may also involve replacing a previously installed model or application, particularly in the case of an update. Alternatively, new behavioral rules may be appended to a pre-existing rule set. In block 616, the processor may complete the installation process by registering the model or application with the analyzer and/or classifier modules. As mentioned above, downloaded data, algorithms, and/or models may be installed in or linked to the analyzer and/or classifier modules in an install or update process so that when the analyzer and/or classifier modules perform real-time analysis operations they do so using the downloaded data, algorithms, and/or models. Once the installation process is complete, the process may begin monitoring, analyzing and/or classifying device behaviors using the downloaded model/application in block 618.

Figure 7:
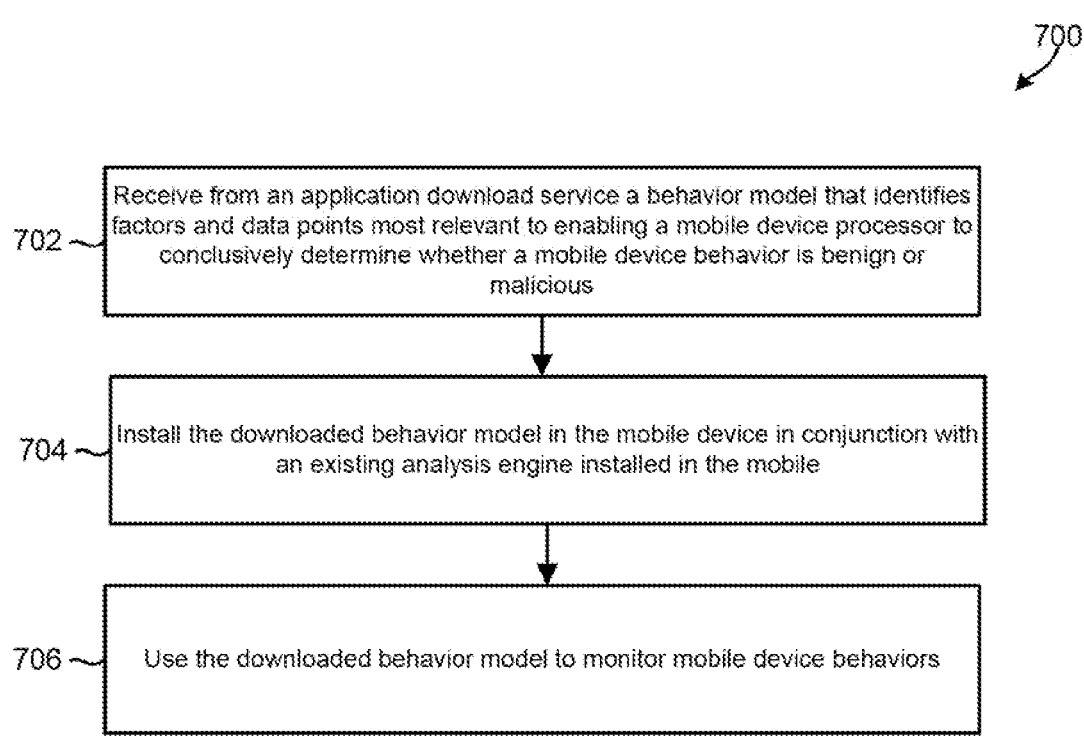
FIG. 7 is a process flow diagram illustrating an aspect method for downloading and using behavior analysis models.

FIG. 7 illustrates an aspect method 700 for downloading and using behavior analysis models. In block 702, a processor of the mobile device may receive a behavior model from an application download service. The behavior model may identify the factors and data points determined to be most relevant to enabling the mobile device processor to better determine whether a mobile device behavior is benign or malicious.

In block 704, the mobile device processor may install the downloaded behavior model in the mobile device in conjunction with an existing analysis engine installed in the mobile device. In an embodiment, this may be achieved by accessing information stored by the API module, such as collaboration information and/or data-structures suitable for interpreting models received from the application download server. Such collaboration information/data-structures may include a dictionary database of the behavior features and grammar for interpreting, analyzing, combining, and/or applying the behavior models, and/or various representations (e.g. a finite state machine, a decision tree, etc.) that map the behavior features to a classification or analysis of the mobile device behaviors, applications or processes. In block 706, the mobile device processor may use the downloaded behavior model to monitor mobile device behaviors.

Figure 8:
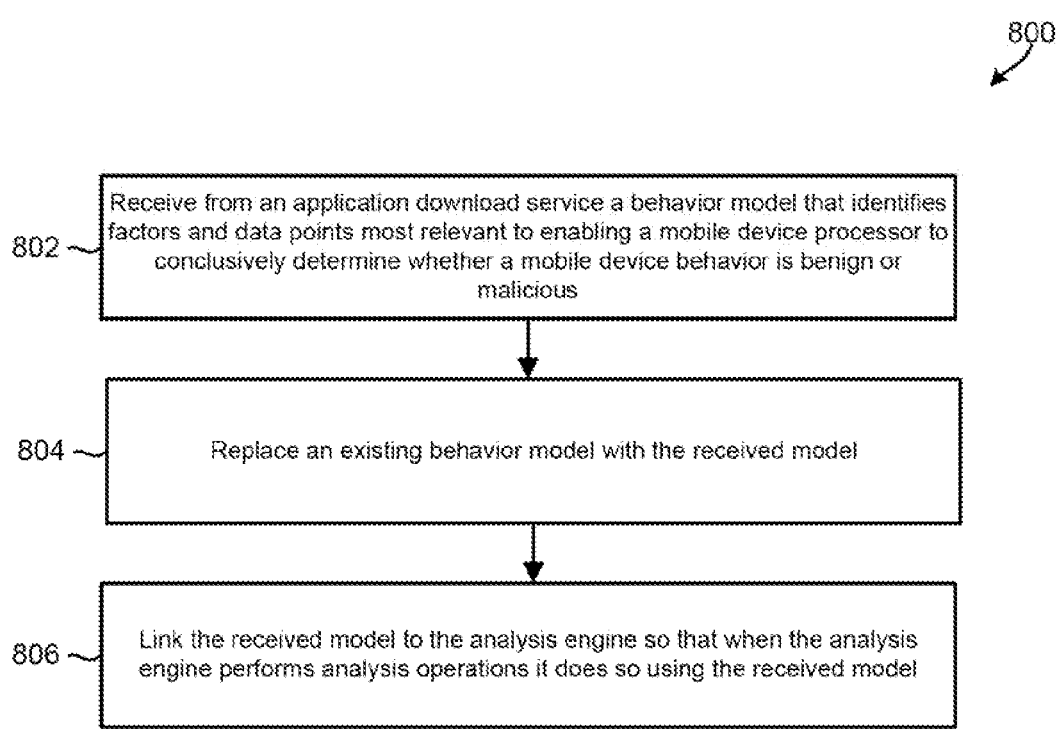
FIG. 8 is a process flow diagram illustrating an aspect mobile device method for downloading and using a replacement behavior analysis module/application.

FIG. 8 illustrates an aspect mobile device method 800 for downloading and using a replacement behavior analysis module/application. In block 802, a processor of the mobile device may receive a behavior model from an application download service. The behavior model may identify the factors and data points determined to be most relevant to enabling the mobile device processor to better determine whether a mobile device behavior is benign or malicious. In block 804, the mobile device processor may replace an existing behavior model with the received model. In block 806, the mobile device processor may link the received model to the analysis engine so that when the analysis engine performs analysis operations, it does so using the received mode.

Figure 9:
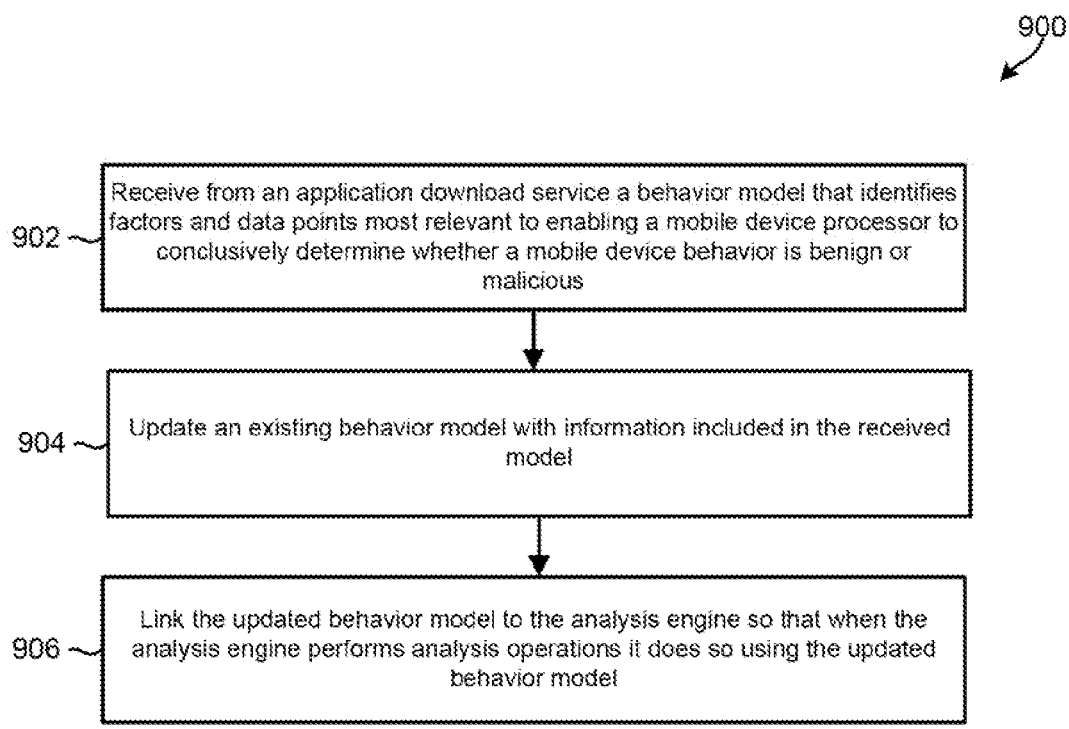
FIG. 9 is a process flow diagram illustrating an aspect mobile device method for downloading a behavior analysis module/application from an application store to a mobile device.

FIG. 9 illustrates an aspect mobile device method 900 for downloading a behavior analysis module/application from an application store to a mobile device. In block 902, a processor of the mobile device may receive a behavior model from an application download service. The behavior model may identify the factors and data points determined to be most relevant to enabling the mobile device processor to better determine whether a mobile device behavior is benign or malicious. In block 904, the mobile device processor may update all or portions of an existing behavior model with information included in the received model. In block 906, the mobile device processor may link the updated model to the analysis engine so that when the analysis engine performs analysis operations, it does so using the updated behavior model.

Figure 10:
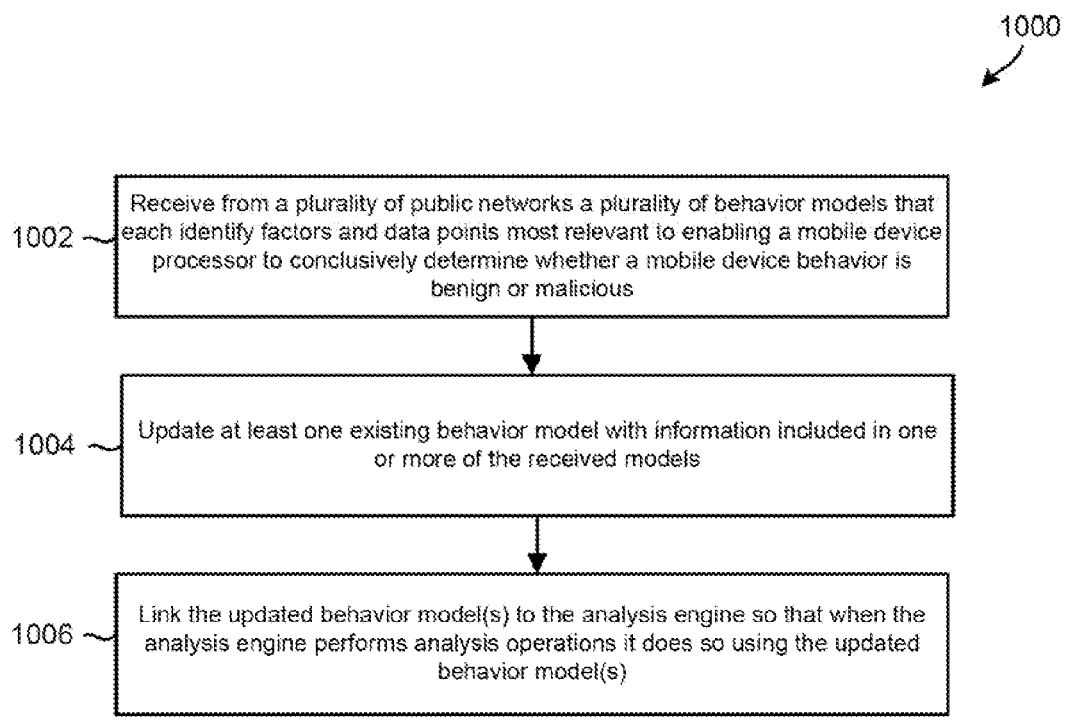
FIG. 10 is a process flow diagram illustrating an aspect mobile device method for downloading a plurality of behavior analysis modules/applications from an plurality of public networks.

FIG. 10 illustrates an aspect method 1000 that may be implemented in a mobile device for downloading a plurality of behavior analysis modules/applications from a plurality of public networks. In block 1002, a processor of the mobile device may receive a plurality of behavior models from a plurality of public networks. Each behavior model may identify the factors and data points determined to be most relevant to enabling the mobile device processor to better determine whether a mobile device behavior is benign or malicious. In block 1004, the mobile device processor may update all or portions of one or more existing behavior models with information included in one or more of the received models. In block 1006, the mobile device processor may link the updated models to the analysis engine so that when the analysis engine performs analysis operations, it does so using the updated behavior models.

Figure 11:
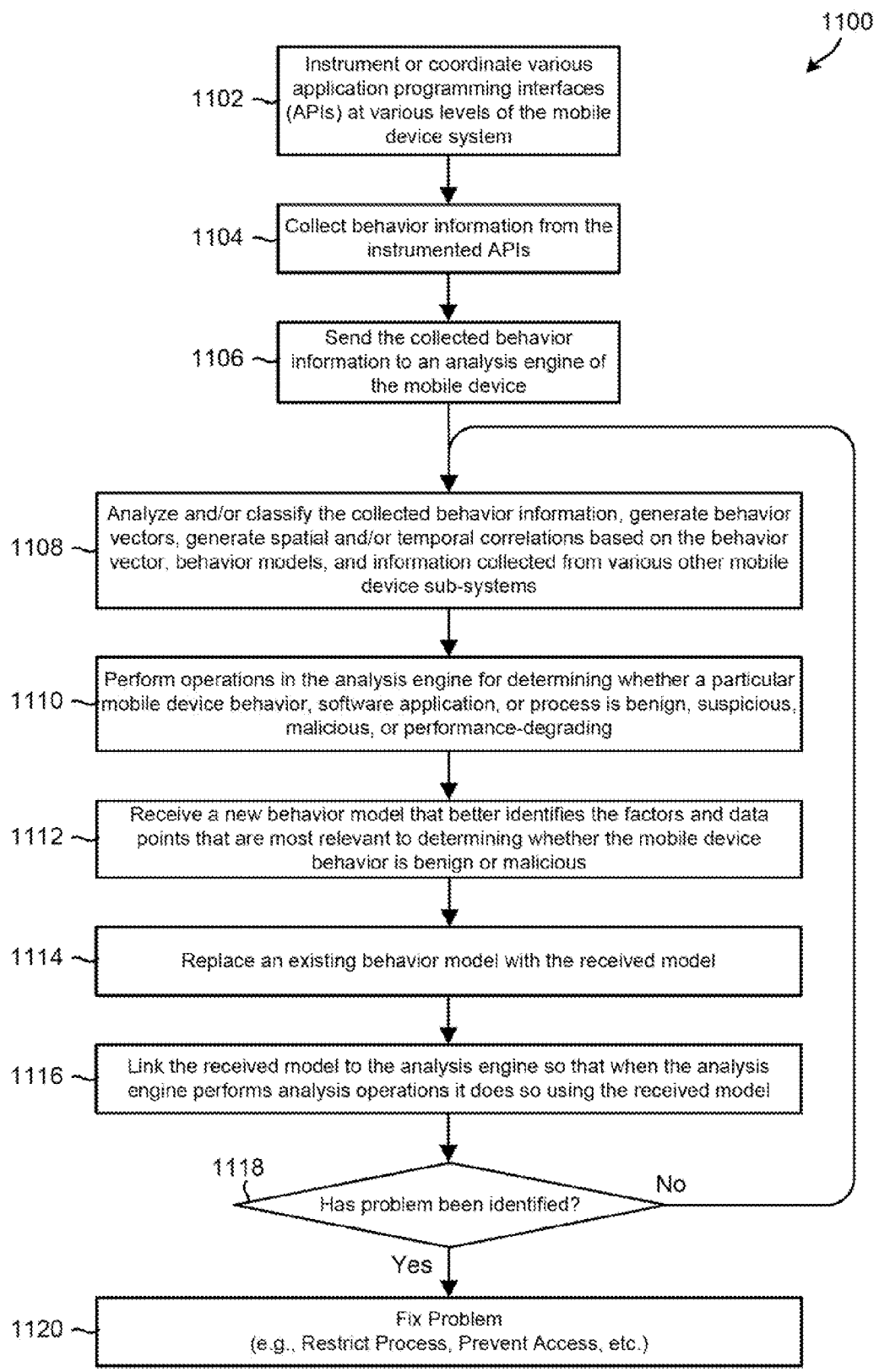
FIG. 11 is a process flow diagram illustrating an aspect mobile device method for performing behavior analysis operations using updated behavior models received from a public network.

FIG. 11 illustrates an aspect method 1100 that may be implemented in a mobile device for performing behavior analysis operations using updated behavior models received from a public network. In block 1102, a processor in a mobile device may instrument or coordinate various APIs, registers, counters or other available information or components at various levels of the mobile device system. In block 1104, the mobile device processor may collect behavior information from the instrumented components. In block 1106, the mobile device processor may send (e.g., via a memory write operation, function call, etc.) the collected behavior information to the classifier module and/or the analyzer module (e.g., via a memory write operation, etc.) of the mobile device.

In block 1108, the mobile device processor may analyze and/or classify the collected behavior information, generate behavior vectors, generate spatial and/or temporal correlations based on the behavior vector, behavior models and information collected from various other mobile device sub-systems. In block 1110, the mobile device processor may begin performing various analysis operations to determine whether a particular mobile device behavior, software application, or process is benign, suspicious, malicious, or performance-degrading.

In block 1112, the mobile device processor may receive a new behavior model that better identifies the factors and data points that are most relevant to determining whether the mobile device behavior is benign or malicious. In block 1114, the mobile device processor may replace an existing behavior model with the received model. In block 1116, the mobile device processor may link the received model to the analysis engine. In determination block 1118, the mobile device may determine whether the mobile device behavior has been classified as being benign or malicious and/or whether a problem has been identified. If the mobile device processor determines that the problem has been identified (i.e., determination block 1118="Yes"), in block 1120, the mobile device processor may perform operations to fix the problem. If the mobile device processor determines that the problem has not been identified (i.e., determination block 1118="No"), the operations in blocks 1108-1116 may be repeated until the problem is identified.

The analyzer module and/or classifier module of the mobile device may be configured to perform real-time analysis operations, which may include performing, executing, and/or applying data, algorithms, and/or models to real time behavior information collected by the observer module to determine whether a mobile device behavior is benign, suspicious, malicious, or performance-degrading. The data, algorithms, and/or models applied by the analyzer and/or classifier modules may be pre-installed on the mobile device, generated on the mobile device, and/or downloaded from or upgraded by any number or combination of public and private cloud services/networks, including third party vendors and application stores. Downloaded data, algorithms, and/or models may be installed in or linked to the analyzer and/or classifier modules in an install or update process so that when the analyzer and/or classifier modules perform real-time analysis operations they do so using the downloaded data, algorithms, and/or models.

Figure 12:
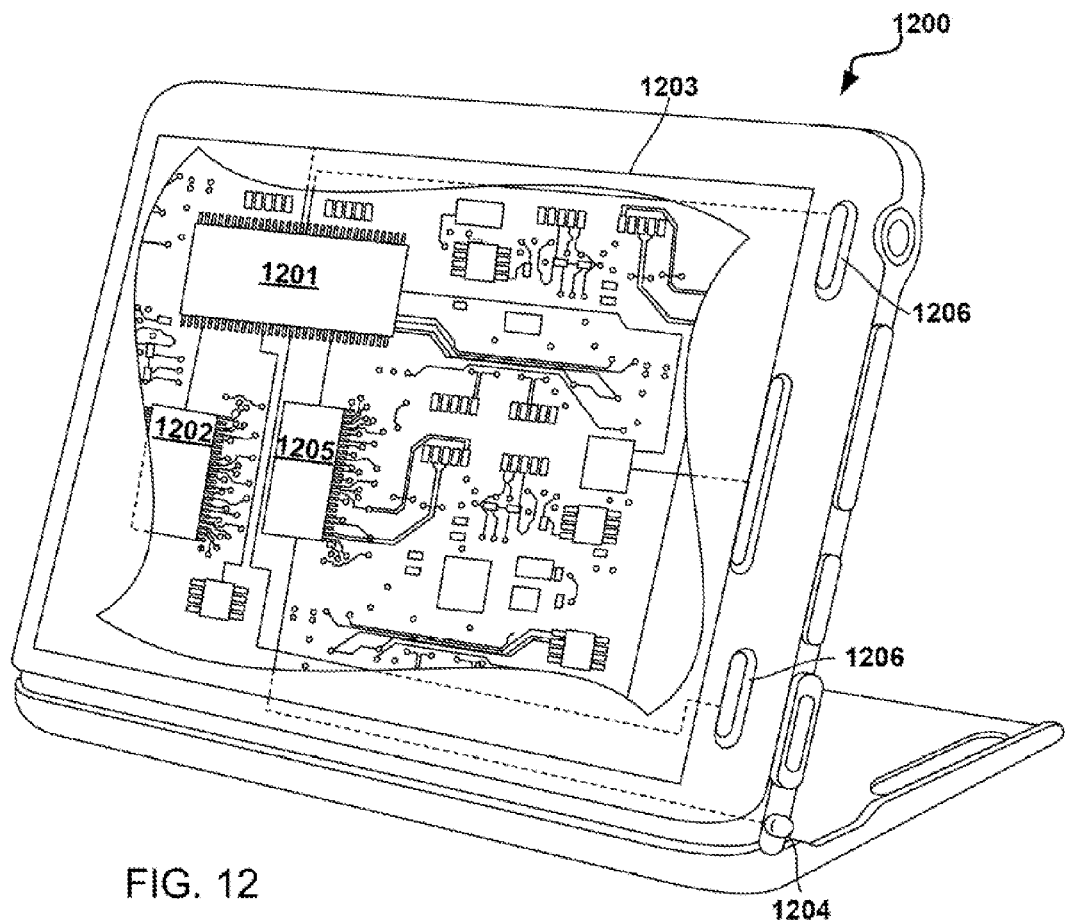
FIG. 12 is a component block diagram of a mobile device suitable for use in an aspect.

The various aspects may be implemented on a variety of mobile computing devices, an example of which is illustrated in FIG. 12 in the form of a smartphone. A smartphone 1202 may include a processor 1201 coupled to internal memory 1202, a display 1203, and to a speaker. Additionally, the smartphone 1202 may include an antenna 1204 for sending and receiving electromagnetic radiation that may be connected to a wireless data link and/or cellular telephone transceiver 1205 coupled to the processor 1201. Smartphones 1202 typically also include menu selection buttons or rocker switches 1206 for receiving user inputs.

A typical smartphone 1202 also includes a sound encoding/decoding (CODEC) circuit 1212, which digitizes sound received from a microphone into data packets suitable for wireless transmission and decodes received sound data packets to generate analog signals that are provided to the speaker to generate sound. Also, one or more of the processor 1201, wireless transceiver 1205 and CODEC 1212 may include a digital signal processor (DSP) circuit (not shown separately).

Figure 13:
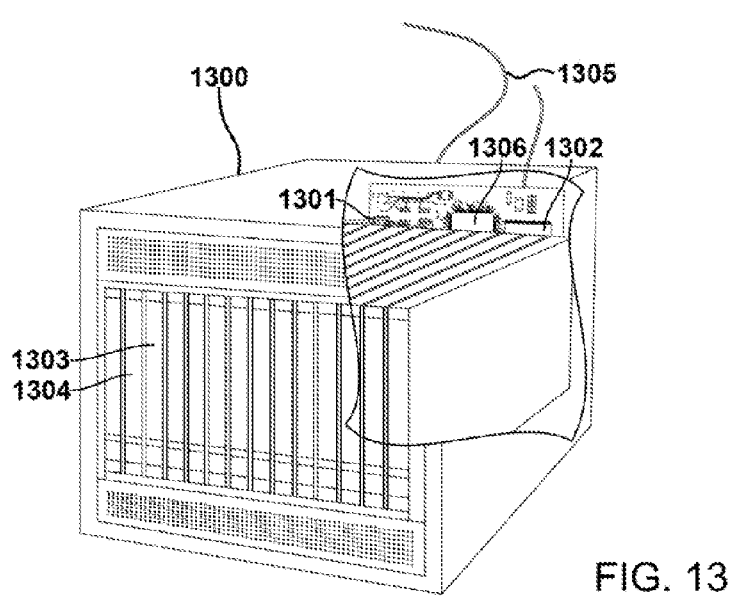
FIG. 13 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1301 coupled to the processor 1301. The server 1300 may also include network access ports 1304 coupled to the processor 1301 for establishing data connections with a network 1305, such as a local area network coupled to other broadcast system computers and servers.

The processors 1201, 1301 may be any programmable microprocessor, microcomputer or multiple processor chip or chips that can be configured by software instructions (applications) to perform a variety of functions, including the functions of the various aspects described below. In some mobile devices, multiple processors 1201 may be provided, such as one processor dedicated to wireless communication functions and one processor dedicated to running other applications. Typically, software applications may be stored in the internal memory 1202, 1302, 1303 before they are accessed and loaded into the processor 1201, 1301. The processor 1201, 1301 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments or open source environments where code that is part of the kernel space must be licensed, while code running in the user-space does not require such licensing. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP, GPU and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for monitoring mobile device behaviors in a mobile device based on models received from multiple model providers, comprising:
    receiving, via a mobile device processor of the mobile device, a first machine learning model from a first model provider, the received first machine learning model identifying factors and data points relevant to enabling the mobile device processor to determine whether a mobile device behavior is benign;
    receiving in the mobile device a second machine learning model from a second model provider that is different than, and operates independent of, the first model provider, the received second machine learning model identifying different factors and data points relevant to enabling the mobile device processor to determine whether the mobile device behavior is benign;
    installing either the first machine learning model or the second machine learning model in the mobile device in conjunction with an existing behavior analyzer engine installed in the mobile device;
    selecting for monitoring one or more mobile device behaviors in the mobile device based on factors and data points identified by the installed machine learning model;
    monitoring the selected mobile device behaviors to collect behavior information;
    using the collected behavior information to perform spatial and/or temporal correlations;
    generating a behavior vector based on a result of the spatial and/or temporal correlations;
    comparing the generated behavior vector to the installed machine learning model to generate a comparison result; and
    determining whether the mobile device behavior is benign based on the comparison result.

2. The method of claim 1, wherein receiving the first machine learning model comprises receiving a finite state machine representation that includes a mapping of features to behavior classifications.

3. The method of claim 1, further comprising:
replacing the installed machine learning model with a third machine learning model received from a third model provider; and
linking the received third machine learning model to the existing behavior analyzer engine so that when the existing behavior analyzer engine performs analysis operations it does so using the received third machine learning model.

4. The method of claim 1, further comprising:
updating the installed machine learning model with information included in a third machine learning model received from a third model provider; and
linking the updated machine learning model to the existing behavior analyzer engine so that when the existing behavior analyzer engine performs analysis operations it does so using the updated machine learning model.

5. The method of claim 1, further comprising:
receiving a plurality of additional machine learning models from a plurality of public networks; and
updating the installed machine learning model with information included in one or more of the received plurality of machine learning models.

6. The method of claim 1, wherein receiving the first machine learning model from the first model provider comprises receiving the first machine learning model from one of:
a cloud service network server;
an app store server;
a web server identified via uniform resource locator address; and
a file transfer protocol service network server.

7. The method of claim 1, wherein receiving the first machine learning model from the first model provider comprises:
accessing and authenticating an online app store by the mobile device processor;
downloading a menu of models available for download or update from the online app store;
receiving in the mobile device processor a user selection input;
requesting download or update of a user-selected model from the online app store; and
receiving the requested user-selected model in a download buffer of the mobile device.

8. The method of claim 1, wherein installing either the first machine learning model or the second machine learning model in the mobile device in conjunction with the existing behavior analyzer engine installed in the mobile device comprises:
validating the received first machine learning model;
installing the validated machine learning model in a memory of the mobile device; and
registering the installed machine learning model with an observer module of the mobile device.

9. The method of claim 1, further comprising:
receiving a new machine learning model that identifies additional factors and data points as being relevant to enabling the mobile device processor to determine whether the mobile device behavior is benign;
updating the installed machine learning model with information included in the new machine learning model in response to determining that an identified mobile device behavior is suspicious; and
comparing the generated behavior vector to the updated machine learning model to determine whether the identified suspicious mobile device behavior is benign.

10. A mobile computing device comprising:
a mobile device processor;
means for receiving a first machine learning model from a first model provider, the received first machine learning model identifying factors and data points relevant to enabling the mobile device processor to determine whether the mobile device behavior is benign;
means for receiving a second machine learning model from a second model provider that is different than, and operates independent of, the first model provider, the received second machine learning model identifying different factors and data points relevant to enabling the mobile device processor to determine whether the mobile device behavior is benign;
means for installing either the first machine learning model or the second machine learning model in conjunction with an existing behavior analyzer engine;
means for selecting for monitoring one or more mobile device behaviors in the mobile computing device based on factors and data points identified by the installed machine learning model;
means for monitoring the selected mobile device behaviors to collect behavior information;
means for using the collected behavior information to perform spatial and/or temporal correlations;
means for generating a behavior vector based on a result of the spatial and/or temporal correlations;
means for comparing the generated behavior vector to the installed machine learning model to generate a comparison result; and
means for determining whether the mobile device behavior is benign based on the comparison result.

11. The mobile computing device of claim 10, wherein means for receiving the first machine learning model comprises means for receiving a finite state machine representation that includes a mapping of features to behavior classifications.

12. The mobile computing device of claim 10, further comprising:
means for replacing the installed machine learning model with a third machine learning model received from a third model provider; and
means for linking the received third machine learning model to the existing behavior analyzer engine so that when the existing behavior analyzer engine performs analysis operations it does so using the received third machine learning model.

13. The mobile computing device of claim 10, further comprising:
means for updating the installed machine learning model with information included in a third machine learning model received from a third model provider; and
means for linking the updated machine learning model to the existing behavior analyzer engine so that when the existing behavior analyzer engine performs analysis operations it does so using the updated machine learning model.

14. The mobile computing device of claim 10, further comprising:
means for receiving a plurality of additional machine learning models from a plurality of public networks; and
means for updating the installed machine learning model with information included in one or more of the received plurality of machine learning models.

15. The mobile computing device of claim 10, wherein means for receiving the first machine learning model from the first model provider comprises means for receiving the first machine learning model from one of:
  a cloud service network server;
  an app store server;
  a web server identified via uniform resource locator address; and
  a file transfer protocol service network server.

16. The mobile computing device of claim 10, wherein means for receiving the first machine learning model from the first model provider comprises:
  means for accessing and authenticating an online app store by the mobile device processor;
  means for downloading a menu of models available for download or update from the online app store;
  means for receiving in the mobile device processor a user selection input;
  means for requesting download or update of a user-selected model from the online app store; and
  means for receiving the requested user-selected model in a download buffer.

17. The mobile computing device of claim 10, wherein means for installing either the first machine learning model or the second machine learning model in conjunction with the existing behavior analyzer engine comprises:
  means for validating the received first machine learning model;
  means for installing the validated machine learning model in memory; and
  means for registering the installed machine learning model with an observer module.

18. The mobile computing device of claim 10, further comprising:
  means for receiving a new machine learning model that identifies additional factors and data points as being relevant to enabling the mobile device processor to determine whether a mobile device behavior is benign;
  means for updating the installed machine learning model with information included in the new machine learning model in response to determining that an identified mobile device behavior is suspicious; and
  means for comparing the generated behavior vector to the updated machine learning model to determine whether the identified suspicious mobile device behavior is benign.

19. A mobile computing device, comprising:
  a memory; and
  a processor coupled to the memory, wherein the processor is configured with processor-executable instructions to perform operations comprising:
    receiving a first machine learning model from a first model provider, the received first machine learning model identifying factors and data points relevant to enabling the processor to determine whether a mobile device behavior is benign;
    receiving a second machine learning model from a second model provider that is different than, and operates independent of, the first model provider, the received second machine learning model identifying different factors and data points relevant to enabling the processor to determine whether the mobile device behavior is benign;
    installing either the first machine learning model or the second machine learning model in conjunction with an existing behavior analyzer engine;
    selecting for monitoring one or more mobile device behaviors in the mobile computing device based on factors and data points identified by the installed machine learning model;
    monitoring the selected mobile device behaviors to collect behavior information;
    using the collected behavior information to perform spatial and/or temporal correlations;
    generating a behavior vector based on a result of the spatial and/or temporal correlations;
    comparing the generated behavior vector to the installed machine learning model to generate a comparison result; and
    determining whether the mobile device behavior is benign based on the comparison result.

20. The mobile computing device of claim 19, wherein the processor is configured with processor-executable instructions to perform operations such that receiving the first machine learning model comprises receiving a finite state machine representation that includes a mapping of features to behavior classifications.

21. The mobile computing device of claim 19, wherein the processor is configured with processor-executable instructions to perform operations further comprising:
  replacing the installed machine learning model with a third machine learning model received from a third model provider; and
  linking the received third machine learning model to the existing behavior analyzer engine so that when the existing behavior analyzer engine performs analysis operations it does so using the received third machine learning model.

22. The mobile computing device of claim 19, wherein the processor is configured with processor-executable instructions to perform operations further comprising:
  updating the installed machine learning model with information included in a third machine learning model received from a third model provider; and
  linking the updated machine learning model to the existing behavior analyzer engine so that when the existing behavior analyzer engine performs analysis operations it does so using the updated machine learning model.

23. The mobile computing device of claim 19, wherein the processor is configured with processor-executable instructions to perform operations further comprising:
  receiving a plurality of additional machine learning models from a plurality of public networks; and
  updating the installed machine learning model with information included in one or more of the received plurality of machine learning models.

24. The mobile computing device of claim 19, wherein the processor is configured with processor-executable instructions to perform operations such that receiving the first machine learning model from the first model provider comprises receiving the first machine learning model from one of:
  a cloud service network server;
  an app store server;
  a web server identified via uniform resource locator address; and
  a file transfer protocol service network server.

25. The mobile computing device of claim 19, wherein the processor is configured with processor-executable instructions to perform operations such that receiving the first machine learning model from the first model provider comprises:

accessing and authenticating an online app store;
downloading a menu of models available for download or update from the online app store;
receiving a user selection input;
requesting download or update of a user-selected model from the online app store; and
receiving the requested user-selected model in a download buffer.

26. The mobile computing device of claim 19, wherein the processor is configured with processor-executable instructions to perform operations such that installing either the first machine learning model or the second machine learning model in conjunction with the existing behavior analyzer engine comprises:
   validating the received first machine learning model;
   installing the validated machine learning model in the memory; and
   registering the installed machine learning model with an observer module.

27. The mobile computing device of claim 19, wherein the processor is configured with processor-executable instructions to perform operations further comprising:
   receiving a new machine learning model that identifies additional factors and data points as being relevant to enabling the processor to determine whether a behavior is benign;
   updating the installed machine learning model with information included in the new machine learning model when it is determined that an identified mobile device behavior is suspicious; and
   comparing the generated behavior vector to the updated machine learning model to determine whether the identified suspicious mobile device behavior is benign.

28. A non-transitory computer readable storage medium having stored thereon processor-executable software instructions configured to cause a mobile device processor of a mobile computing device to perform operations comprising:
   receiving a first machine learning model from a first model provider, the received first machine learning model identifying factors and data points relevant to enabling the mobile device processor to determine whether a mobile device behavior is benign;
   receiving a second machine learning model from a second model provider that is different than, and operates independent of, the first model provider, the received second machine learning model identifying different factors and data points relevant to enabling the mobile device processor to determine whether the mobile device behavior is benign;
   installing either the first machine learning model or the second machine learning model in conjunction with an existing behavior analyzer engine;
   selecting for monitoring one or more mobile device behaviors in the mobile computing device based on factors and data points identified by the installed machine learning model;
   monitoring the selected mobile device behaviors to collect behavior information;
   using the collected behavior information to perform spatial and/or temporal correlations;
   generating a behavior vector based on a result of the spatial and/or temporal correlations;
   comparing the generated behavior vector to the installed machine learning model to generate a comparison result; and
   determining whether the mobile device behavior is benign based on the comparison result.

29. The non-transitory computer readable storage medium of claim 28, wherein the stored processor-executable software instructions are configured to cause the mobile device processor to perform operations such that receiving the first machine learning model comprises receiving a finite state machine representation that includes a mapping of features to behavior classifications.

30. The non-transitory computer readable storage medium of claim 28, wherein the stored processor-executable software instructions are configured to cause the mobile device processor to perform operations further comprising:
   replacing the installed machine learning model with a third machine learning model received from a third model provider; and
   linking the received third machine learning model to the existing behavior analyzer engine so that when the existing behavior analyzer engine performs analysis operations it does so using the received third machine learning model.

31. The non-transitory computer readable storage medium of claim 28, wherein the stored processor-executable software instructions are configured to cause the mobile device processor to perform operations further comprising:
   updating the installed machine learning model with information included in a third machine learning model received from a third model provider; and
   linking the updated machine learning model to the existing behavior analyzer engine so that when the existing behavior analyzer engine performs analysis operations it does so using the updated machine learning model.

32. The non-transitory computer readable storage medium of claim 28, wherein the stored processor-executable software instructions are configured to cause the mobile device processor to perform operations further comprising:
   receiving a plurality of additional machine learning models from a plurality of public networks; and
   updating the installed machine learning model with information included in one or more of the received plurality of machine learning models.

33. The non-transitory computer readable storage medium of claim 28, wherein the stored processor-executable software instructions are configured to cause the mobile device processor to perform operations such that receiving the first machine learning model from the first model provider comprises receiving the first machine learning model from one of:
   a cloud service network server;
   an app store server;
   a web server identified via uniform resource locator address; and
   a file transfer protocol service network server.

34. The non-transitory computer readable storage medium of claim 28, wherein the stored processor-executable software instructions are configured to cause the mobile device processor to perform operations such that receiving the first machine learning model from the first model provider comprises:
   accessing and authenticating an online app store;
   downloading a menu of machine learning models available for download or update from the online app store;
   receiving a user selection input;
   requesting download or update of a user-selected machine learning model from the online app store; and
   receiving the requested user-selected machine learning model in a download buffer.

35. The non-transitory computer readable storage medium of claim 28, wherein the stored processor-executable software instructions are configured to cause the mobile device processor to perform operations such that installing either the first machine learning model or the second machine learning model in conjunction with the existing behavior analyzer engine comprises:
- validating the received first machine learning model;
- installing the validated machine learning model in memory; and
- registering the installed machine learning model with an observer module.

36. The non-transitory computer readable storage medium of claim 28, wherein the stored processor-executable software instructions are configured to cause the mobile device processor to perform operations further comprising:
- receiving a new machine learning model that identifies additional factors and data points as being relevant to enabling the mobile device processor to determine whether a behavior is benign;
- updating the installed machine learning model with information included in the new machine learning model in response to determining that an identified mobile device behavior is suspicious; and
- comparing the generated behavior vector to the updated machine learning model to better determine whether the identified suspicious mobile device behavior is benign.

* * * * *